(12) United States Patent
Sirkar et al.

(10) Patent No.: US 7,811,381 B2
(45) Date of Patent: Oct. 12, 2010

(54) ANTISOLVENT CRYSTALLIZATION IN POROUS HOLLOW FIBER DEVICES AND METHODS OF USE THEREOF

(76) Inventors: Kamalesh K. Sirkar, 20 Hughes Rd., Bridgewater, NJ (US) 08807; Dimitrios Zarkadas, 364 N. Ave., Fanwood, NJ (US) 07032

(*) Notice: Subject to any disclaimer, the term of this patent is extended or adjusted under 35 U.S.C. 154(b) by 792 days.

(21) Appl. No.: 11/811,557

(22) Filed: Jun. 11, 2007

(65) Prior Publication Data
US 2007/0289105 A1 Dec. 20, 2007

Related U.S. Application Data

(60) Provisional application No. 60/813,756, filed on Jun. 14, 2006.

(51) Int. Cl.
*C30B 7/14* (2006.01)
(52) U.S. Cl. .............................. 117/68; 117/69; 117/70
(58) Field of Classification Search .................... 117/68, 117/69, 70
See application file for complete search history.

(56) References Cited

U.S. PATENT DOCUMENTS 6,482,438 B1 * 11/2002 Singh et al. ................. 424/489

OTHER PUBLICATIONS

Korean Patent Application No. 1020020058340 to Jung et al., having Publication date of Nov. 18, 2002 (w/ English Abstract page).
Azoury et al., "Crystallization Processes Using Reverse Osmosis," *Journal of Crystal Growth*, 79, 654-657 (1986).
Azoury et al., "Habit Modifiers Of Calcium Oxalate Crystals Precipitated In A Reverse Osmosis System," *Journal of Crystal Growth*, 76, 259-262 (1986).
Azoury et al., "Calcium Oxalate Precipitation In A Flow System: An Attempt To Simulate The Early Stages Of Stone Formation In The Renal Tubules," *Journal of Urology*, 136(1), 150-153 (1986).
Azoury et al., "Generation Of Supersaturation Using Reverse Osmosis," *Chemical Engineering Research & Design*, 65, 342-344 (1987).
Curcio et al., "Membrane Crystallizers," *Industrial & Engineering Chemistry Research*, 40, 2679-2684 (2001).
Curcio et al., "Membrane Crystallization Of Macromolecular Solutions," *Desalination*, 145, 173-177 (2002).
Curcio et al., "Recovery Of Fumaric Acid By Membrane Crystallization In The Production of L-malic Acid," *Separation and Purification Technology*, 33, 63-73 (2003).

(Continued)

*Primary Examiner*—Robert M Kunemund
(74) *Attorney, Agent, or Firm*—McCarter & English, LLP

(57) ABSTRACT

Antisolvent crystallization systems and methods are provided that employ porous hollow fiber membranes. The porous hollow fiber membrane includes a plurality of porous hollow fibers positioned within a shell, each porous hollow fiber defining a lumen side and shell side. A crystallizing solution is introduced to one side of the hollow fibers and an antisolvent is introduced to the other side of the fibers, in either cocurrent or countercurrent flow. One of the antisolvent and the crystallizing solution permeates in part through the porous hollow fiber membrane to the other side and crystals are formed thereby. Permeation of the antisolvent or the crystallizing solution establishes advantageous radial mixing that facilitates crystal formation of a desired size distribution. Downstream mixing, e.g., a completely stirred tank or a static mixer, may be employed to further improve crystallization operations.

25 Claims, 15 Drawing Sheets

OTHER PUBLICATIONS

Curcio et al., "A New Membrane-Based Crystallization Technique: Tests On Lysozyme," *Journal of Crystal Growth*, 247, 166-176 (2003).

Todd et al., "Application Of Osmotic Dewatering To The Controlled Crystallization Of Biological Macromolecules And Organic Compounds," *Journal of Crystal Growth*, 110, 283-292 (1991).

Zhiqian et al., "Synthesis Of Nanosized Baso$_4$ Particles With A Membrane Reactor: Effects Of Operating Parameters On Particles," *Journal of Membrane Science*, 209, 153-161 (2002).

Zarkadas et al., "Solid Hollow Fiber Cooling Crystallization," *Industrial & Engineering Chemistry Research*, 43(22), 7163-7180 (2004).

Zarkadas et al., "Cooling Crystallization of Paracetamol in Hollow Fiber Devices," *Industrial and Engineering Chemistry Research*, 46, 2928-2935 (2007).

Prasad et al., "Dispersion-Free Solvent Extraction With Microporous Hollow-Fiber Modules," *AIChE Journal*, 34(2), 177-188 (1988).

Mahajan et al., "Analysis Of Size Distribution And Growth Kinetics During The Batch Crystallization Of L-Asparagine," *AIChE Symposium Series*, 87(284), 143-157 (1991).

Deshpande et al., "Effect Of Mixing On Size Distribution During Precipitation Of L-Asparagine In An Agitated Crystallizer," *Proceedings of the 14th International Symposium on Industrial Crystallization*, Cambridge, UK, 340-348 (1999).

Garside et al., "Mixing, Reaction And Precipitation: Limits Of Micromixing In An MSMPR Crystallizer," *Chemical Engineering Science*, 40(8), 1485-1493 (1985).

Tavare, "Micromixing Limits In An MSMPR Crystallizer," *Chemical Engineering Technology*, 12, 1-12 (1989).

Mahajan et al., "Rapid Precipitation Of Biochemicals," *Journal of Physics: Applied Physics*, 26(8B), B176-B180 (1993).

Mahajan et al., "Nucleation And Growth Kinetics Of Biochemicals Measured At Very High Supersaturation," *Journal of Crystal Growth*, 144(3-4), 281-290 (1993).

\* cited by examiner (a)

(b)

ANTISOLVENT CRYSTALLIZATION IN POROUS HOLLOW FIBER DEVICES AND METHODS OF USE THEREOF

CROSS-REFERENCE TO RELATED APPLICATIONS

The present application claims the benefit of a commonly assigned, co-pending provisional patent application entitled "Antisolvent Crystallization in Porous Hollow Fiber Device and Method of Use Thereof," which was filed on Jun. 14, 2006 and assigned Ser. No. 60/813,756. The entire contents of the foregoing provisional patent application are incorporated herein by reference.

BACKGROUND

1. Technical Field

The present disclosure pertains to antisolvent crystallization and, more particularly, to antisolvent crystallization performed in porous hollow fiber devices. More specifically, the present disclosure is directed to antisolvent crystallization, i.e., mixing of two miscible liquids/solutions, in porous hollow fiber devices that facilitate advantageous levels of radial mixing not present in conventional tubular devices.

2. Background Art

Crystallization and precipitation processes are widely used in the chemical and pharmaceutical industries for the separation, purification and/or production of bulk or fine chemicals. The role of crystallization in the production of crystalline commodity products, such as bulk chemicals, sugar, salt and many fertilizers, is important and the process itself is reasonably well established and understood, as summarized in the related literature. In recent years, the importance of fine chemicals and specialty products and their high added value have shifted interest in crystallization research towards organic materials, an area relatively undeveloped until the late 1980's.

The pharmaceutical industry produces a range of crystalline products of high value. It is estimated that over 90% of all pharmaceutical products contain an active ingredient in particulate form, while 65% of FDA-approved new drug entities in 2000 and 2001 were in solid form. Properties of interest include: a narrow crystal size distribution (CSD), crystal shape/habit and purity. In some embodiments, small crystal sizes may be preferred, since smaller particles may dissolve more readily according to the Noyes-Whitney equation and can increase the speed of action and bioavailability of the drug. Such properties are determined from a variety of factors, such as crystallization technique employed, type and size of equipment used, operating conditions, and choice of solvent.

Crystallization is generally carried out in stirred vessels, whether in batch or continuous processes. Despite the fact that industrial crystallizers can be successfully operated, there is often considerable variability in the crystal size distribution. Further, due to imperfect mixing and non-uniform supersaturation conditions inside the crystallizer, there may be issues in obtaining a small mean crystal size. Non-uniform supersaturation can lead to uncontrolled nucleation and non-uniform growth, effects that are clearly undesirable.

Imperfect mixing is an inherent characteristic of Mixed Suspension Mixed Product Removal (MSMPR) crystallizers. Indeed, imperfect mixing has been repeatedly reported in the literature for industrial crystallizers where performance is frequently characterized by segregation effects. Imperfect mixing is also not uncommon in small scale applications. For example, large differences in CSD characteristics of samples obtained from different points of a 10 L laboratory cooling crystallizer have been reported for potassium nitrate. Upon scale-up, such mixing problems can become dominant, leading to a broad CSD and a final product that does not meet its initial specifications.

Scale-up problems are more pronounced and difficult to address for antisolvent crystallization processes. In this case, effective mixing is needed at the addition point and thereafter. Micromixing and macromixing issues should also be addressed to achieve effective antisolvent crystallization. Often neglected, mesomixing can also be an important factor in the design and operation of a crystallizer, particularly if the feed point is above surface and the induction time is small.

Two approaches have generally been followed to overcome the above-mentioned shortcomings. The first approach for improving existing facilities involves the application of in situ monitoring techniques that can lead to and facilitate better prediction and control of the applied supersaturation, which can translate to better control of the final CSD. This approach to in situ monitoring has become popular, particularly in the pharmaceutical industry where the Process Analytical Technology (PAT) initiative is expected to transform the way the process is operated. However, as previously noted, well-mixed crystallizers are intrinsically inclined towards a spectrum of local conditions in time and space and, consequently, a relatively broad CSD.

The second approach involves development of new crystallization techniques where supersaturation can be created and depleted on a microscale, resulting in a narrow CSD and a small crystal size. An example of this second approach is an impinging-jet mixer technique, where two high velocity streams are brought into contact to effect high nucleation rates, followed by growth in a well-mixed vessel or a tubular precipitator. Although this technique can result in narrow CSDs with a small crystal size, it has certain limitations. For example, the impinging-jet mixer technique often suffers from jet alignment problems and its applicability is limited to streams with a viscosity ratio smaller than 3.5, since mixing is poor for larger values. Another technique suitable for the production of pharmaceutical solids is spherical crystallization for which only the goal of a narrow CSD is obtained. Spherical crystallization generally produces crystals that are spherical agglomerates of relatively high porosity, consisting of smaller, usually needle-like crystals. Other approaches undertaken include emulsion crystallization and precipitation with supercritical fluids. The latter technique shows promising results, although it has not yet been commercialized.

The use of polymeric membranes in flat or hollow fiber form as a means to induce crystallization has lately gained renewed interest. The observation of crystal formation on the surface of polymeric membranes is as old as the process of reverse osmosis (RO). An early study of reverse osmosis as a crystallization technique was performed by Azoury et al. [See, Azoury et al., "Crystallization processes using reverse osmosis," *Journal of Crystal Growth*, 79, 654-657 (1986); Azoury et al., "Habit modifiers of calcium oxalate crystals precipitated in a reverse osmosis system," *Journal of Crystal Growth*, 76, 259-262 (1986); Azoury et al., "Calcium oxalate precipitation in a flow system: An attempt to simulate the early stages of stone formation in the renal tubules," *Journal of Urology*, 136(1), 150-153 (1986); and Azoury et al., "Generation of supersaturation using reverse osmosis," *Chemical Engineering Research & Design*, 65, 342-344 (1987).]

In particular, Azoury et al. studied the precipitation of calcium oxalate in hollow fiber reverse osmosis modules to simulate the early stages of stone formation in renal tubules.

They reported mean crystal sizes ranging from 3.9-5.1 μm, while the standard deviation (SD) of the mean size was between 0.3-0.5 μm, resulting in a coefficient of variation (CV) of only 10%. Calcium oxalate is a sparingly soluble system; hence, a low mean size and coefficient of variation should be anticipated. However, the SD and CV values achieved in these studies are extremely low and indicative of the level of supersaturation generation and control that hollow fiber membrane devices can achieve. Azoury et al. also reported that about 10% of the formed crystals remained inside the reverse osmosis module. Since the concentration of calcium oxalate in the feed was low, it seems that scaling problems will be more severe for a readily soluble system. This would result in pore blockage and consequently a reduction in the flux and the generated supersaturation.

Membrane distillation, which is a solvent removal method like reverse osmosis, was used recently for crystallization. [See, Curcio et al., "Membrane Crystallizers," *Industrial & Engineering Chemistry Research*, 40, 2679-2684 (2001); Curcio et al., "Membrane crystallization of macromolecular solutions," *Desalination*, 145, 173-177 (2002); Curcio et al., "Recovery of fumaric acid by membrane crystallization in the production of L-malic acid," *Separation and Purification Technology*, 33, 63-73 (2003); and Curcio et al., "A new membrane-based crystallization technique: tests on lysozyme," *Journal of Crystal Growth*, 247, 166-176 (2003).] In membrane distillation, the solvent (water) is removed by evaporation through the pores of a hydrophobic membrane. Curcio et al. reported results for an experimental configuration where a hollow fiber membrane device was used to create uniform supersaturation, while crystallization took place in a magma circulating crystallizer. Sodium chloride was studied and relatively narrow CSDs were obtained; CV values between 42-57% were reported, representative of the values obtained in magma crystallizers. However, flux declined with time due to pore blockage.

Better results in terms of flux decline were reported by Curcio et al. in a later study of fumaric acid crystallization in aqueous L-malic acid solutions. However, the lower flux decline can be easily attributed to the much lower solubility of fumaric acid as compared to NaCl. The reported CV values of around 40% were similar to the previous NaCl study. Membrane distillation was also applied to the growth of single protein crystals suitable for X-ray diffraction measurements. This technique utilizes both flat and hollow fiber membranes and is also suitable for the determination of the crystallization kinetics. A similar technique based on reverse osmosis membranes, i.e., osmotic dewatering, has been proposed for the same purpose. [See, Todd et al., "Application of osmotic dewatering to the controlled crystallization of biological macromolecules and organic compounds," *Journal of Crystal Growth*, 110, 283-292 (1991).]

Membrane reactors were also tested recently for the precipitation of barium sulfate. [See, Zhiqian et al., "Synthesis of nanosized $BaSO_4$ particles with a membrane reactor: Effects of operating parameters on particles," *Journal of Membrane Science*, 209, 153-161 (2002).] Ultrafiltration hollow fiber membranes of various molecular weight cut off (MWCO) sizes were tested. In this configuration, one of the reactants ($Na_2SO_4$) was introduced to the shell side, which is kept at a higher pressure relative to the lumen side, and passes through the membrane to the lumen side. On the lumen side, the $Na_2SO_4$ reacts with $BaCl_2$ to form barium sulphate. Nanosized particles having a primary size of about 70 nm were produced with the smaller MWCO membranes. However, no quantitative CSD information was given and particle aggregation was evident in the transmission electron microscopy images presented. Agglomeration was found to increase with MWCO due to the transmembrane flux increase caused by the larger pores. Fouling problems were also reported which, due to the low reactant concentrations, must be more pronounced at higher concentrations.

Zarkadas and Sirkar recently proposed a new cooling crystallization technique based on solid (nonporous) hollow fibers. [See, Zarkadas et al., "Solid Hollow Fiber Cooling Crystallization," *Industrial & Engineering Chemistry Research*, 43(22), 7163-7180 (2004).] This technique was applied to both inorganic and organic systems, including a pharmaceutical compound. A combination of a solid hollow fiber crystallizer with a mixing device downstream provided the most successful results. For an aqueous potassium nitrate system, this design provided crystal size distributions with 3-4 times smaller mean sizes compared to those obtained in MSMPR crystallizers. In addition, the nucleation rates achieved were 2-3 orders of magnitude higher. Experimental runs with aqueous paracetamol (4-acetamidophenol) solutions showed that a solid hollow fiber crystallizer (SHFC) static mixer assembly can be operated successfully up to 30-40° C. below published data for the metastable zone limit, a capability non-existent in industrial cooling crystallizers. [See, Zarkadas et al., "Cooling Crystallization of Paracetamol in Hollow Fiber Devices," *Industrial and Engineering Chemistry Research*, 46, 2928-2935 (2007).] This ability allows the achievement of very high nucleation rates and the decoupling of nucleation and growth, an opportunity offered currently only by impinging jet mixers for antisolvent crystallization.

Despite efforts to date, a need remains for crystallization systems and methods that offer enhanced performance and that may be scaled up to industrial scale while maintaining superior operational performance and yielding crystals having desirable physical properties. These and other needs are satisfied by the systems and methods disclosed herein, as will be apparent from the description which follows.

SUMMARY

Advantageous antisolvent crystallization systems and methods are provided herein. In exemplary embodiments, the disclosed systems and methods employ porous hollow fiber membranes that include a plurality of porous hollow fibers positioned within a shell. Various shell geometries may be employed, e.g., cylindrical, rectangular and the like. Each porous hollow fiber defines a lumen side and shell side. A crystallizing solution in introduced to one side of the hollow fibers, i.e., the lumen side or the shell side, and an antisolvent is introduced to the other side of the fibers. The crystallizing solution and the antisolvent define miscible fluids/solution. The antisolvent is generally a non-aqueous fluid. Flow within the porous hollow fiber membrane may be either cocurrent or countercurrent. Operation of the porous hollow fiber membrane may be continuous, batch or semi-batch.

In operation, a portion of either the antisolvent or the crystallizing solution permeates through the porous hollow fiber membrane to contact the other fluid/solution, thereby effecting crystallization from the crystallizing solution. The disclosed crystallization phenomenon is to be distinguished from reaction-based systems, wherein first and second reactants are brought into contact and precipitation results from an associated reaction therebetween.

Operating conditions, e.g., pressure differential, flow velocities and the like, influence system operation, e.g., the degree and rate of permeation. Permeation of the antisolvent or the crystallizing solution establishes advantageous radial mixing that facilitates crystal formation of a desired size distribution. More specifically, radial mixing is enhanced by the cross flow of the permeate, which introduces three-dimensional velocity fluctuations characteristic of turbulent flow. More specifically, two particular embodiments of porous hollow fiber antisolvent crystallization systems according to the present disclosure include permeating antisolvent from the shell to the lumen and permeating the crystallizing solution from the lumen to the shell. Downstream mixing, e.g., a completely stirred tank or a static mixer, may be employed to further improve crystallization operations.

The disclosed systems and methods offer significant operational advantages having wide ranging industrial applicability. Additional features, functions and benefits of the disclosed systems and methods will be apparent from the detailed description which follows, particularly when read in conjunction with the appended figures.

BRIEF DESCRIPTION OF FIGURES

To assist those of skill in the art to make and use the disclosed systems and methods, reference is made to the accompanying figures, wherein:

FIG. 1 provides schematics of porous hollow fiber antisolvent crystallization (PHFAC) systems according to the present disclosure, wherein FIG. 1(a) shows an exemplary implementation wherein crystallization occurs on the lumen side and FIG. 1(b) shows an exemplary implementation wherein crystallization occurs on the shell side.

FIG. 2(b) shows an exemplary design for achieving crystallization in the shell side.

DESCRIPTION OF EXEMPLARY EMBODIMENT(S)

The present disclosure is directed to antisolvent crystallization systems and methods that are implemented in an advantageous flow environment that differs significantly from flow environments available in current industrial devices and/or implementations. More particularly, the disclosed systems and methods employ porous hollow fiber devices to achieve desirable results in non-reactive, antisolvent crystallization applications. The disclosed systems and methods provide advantageously compact designs that are extremely efficient on a volumetric basis and are easy to scale up and control. The disclosed porous hollow fiber devices promote the creation of homogeneous concentration conditions on a scale considerably smaller than existing industrial crystallizers without the necessity of large energy input, properties that are desirable but rarely achieved in industrial crystallizers.

Figure 1:
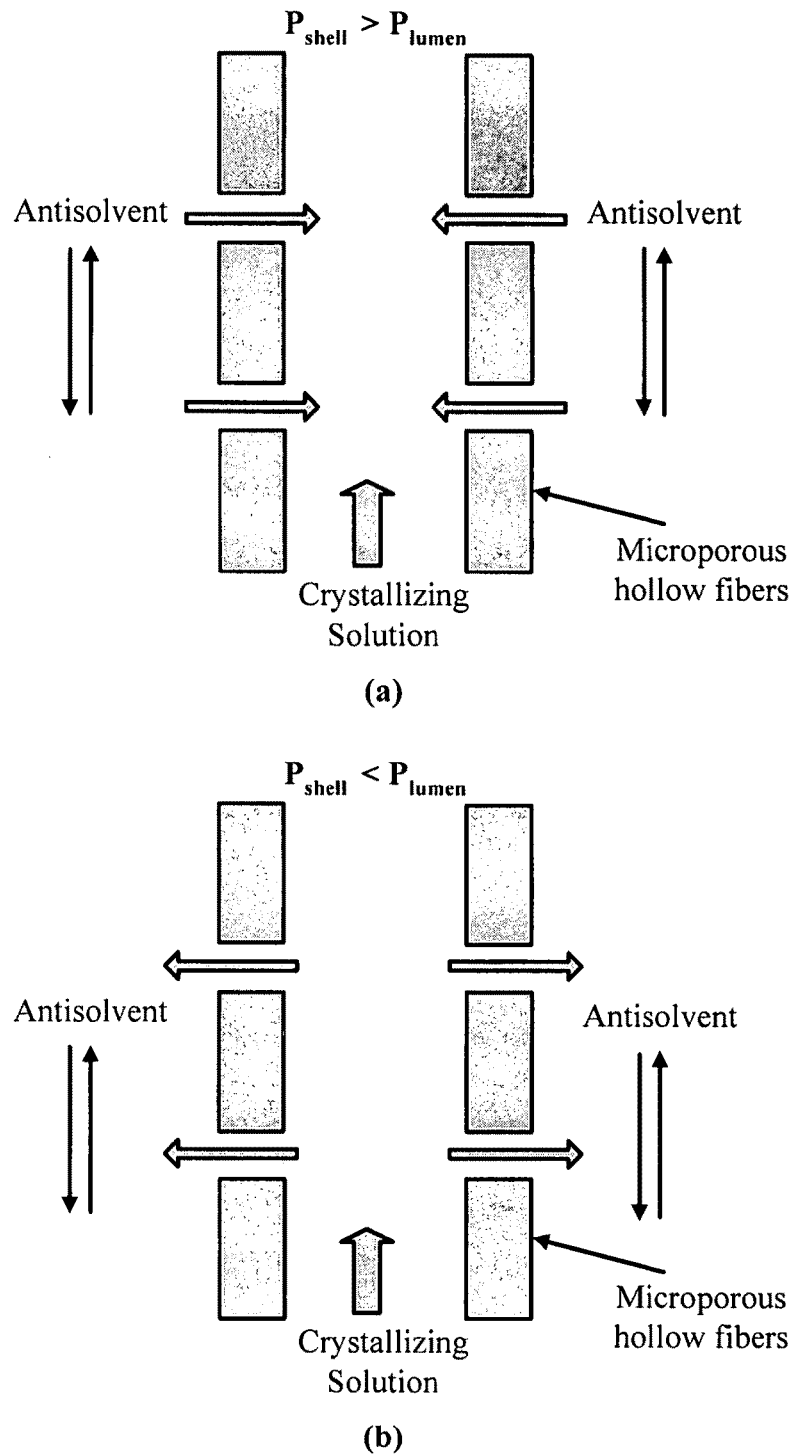

Two exemplary embodiments of the disclosed antisolvent crystallization system and technique are schematically depicted in FIG. 1. FIG. 1a depicts an embodiment wherein an antisolvent is added to a crystallizing solution flowing in the lumen side of a microporous hollow fiber membrane. The antisolvent and the solution are miscible and the antisolvent is a non-aqueous fluid. The shell side pressure is kept higher and at a level that facilitates an appropriate and/or desired antisolvent permeation rate. An opposite scheme wherein a crystallizing solution is added to the antisolvent flowing in the lumen side may also be employed according to the present disclosure. According to the present disclosure, supersaturation is advantageously created or established locally at the mouth of a very large number of pores. In addition, the antisolvent is distributed evenly and mixing with the crystallizing solution is further facilitated by small fiber diameters associated with exemplary implementations of the present disclosure.

FIG. 1b schematically depicts an alternative antisolvent crystallization system and technique according to the present disclosure, wherein permeation of the tube side fluid to the shell side of the membrane device is achieved, e.g., by keeping the lumen side pressure higher. The alternative system/method of FIG. 1b presents certain advantages as compared to tube side permeation. For example, in some embodiments, it may be easier to pressurize the tube side from an operational point of view. In an alternative embodiment, permeation to the shell side may not include an appreciable pressure drop due to the additional volumetric flow rate of permeate. The shell side cross sectional area may be larger as compared to the tube side cross-sectional area and may accommodate the permeate flow without a significant increase in pressure drop. In exemplary implementations of the present disclosure, crystals may be formed on the outside surface of the fibers. These crystals may be more easily swept away by the shell side fluid, which can often flow under turbulent flow conditions.

In some embodiments, the flow environment of the disclosed porous hollow fiber antisolvent crystallization (PHFAC) systems/devices offers several advantages as compared to industrial antisolvent crystallizers. For example, the disclosed PHFAC systems/devices may increase micromixing efficiency. The submicron or nanometer size membrane pores may also result in the permeation of antisolvent/crystallizing solution in the form of unstable droplets or jets in the micron range. Thus, a large interfacial area between the two initially segregated fluids may be generated, which is exactly the objective of mixing. It is noted that membrane devices have been used successfully to produce fine emulsions of well-defined size and droplet size distribution. Even when non-optimal conditions are used, the droplet or jet diameter will rarely exceed 50-100 µm. These sizes are comparable to the Kolmogorov scale, especially for viscous fluids.

For context, the Kolmogorov scale for common solvents is given in Table 1 below for two different values of the mean specific power input, 1 W/kg and 10 W/kg, the latter representing an approximate upper limit for stirred crystallizers. It is apparent from the data set forth in Table 1 that, even for low viscosity solvents, the Kolmogorov scale will be at least 10-20 µm and in most cases about 40-50 µm. For more viscous solvents like t-butanol, the Kolmogorov scale can often exceed 100 µm. It follows that porous hollow fiber devices can disperse a fluid into fine elements, bypassing the necessity (or minimizing the need) for mechanical mixing which is generally necessary to bring the feed stream down to the Kolmogorov scale. This inherent capability of porous hollow fiber devices is more pronounced in viscous systems and can also result in a significant and advantageous reduction in energy consumption.

TABLE 1

Kolmogorov Scale Achieved in Stirred Crystallizers for Common Solvents at 25° C.

| Solvent | $\epsilon = 1$ W/kg $\lambda_K$ (µm) | $\epsilon = 10$ W/kg |
|---|---|---|
| Water | 28 | 16 |
| Ethanol | 40 | 23 |
| 2-Propanol | 64 | 36 |
| t-Butanol | 116 | 65 |
| n-Hexane | 80 | 45 |
| Toluene | 22 | 12 |
| Ethyl Acetate | 18 | 10 |

In some disclosed embodiments, use of porous hollow fiber devices for antisolvent crystallization may reduce or, in some embodiments, eliminate mesomixing limitations due to the extremely large number of feed introduction points, e.g., the membrane pores. Mesomixing issues can be important in precipitation, particularly at high supersaturations, and for compounds with induction times comparable to or smaller than the characteristic mixing times. Similar to the performance improvement of chemical reactors by increasing the number of feed points, the introduction of the antisolvent/crystallizing solution through an extremely large number of pores can be expected to result in uniform supersaturation generation and better performance as compared to single or multiple feed points used in stirred tanks. In some embodiments, there may be 3-4 feed introduction points.

According to an exemplary embodiment of the present disclosure, antisolvent may be added through the pores in a direction perpendicular to the main flow and in a random manner both in time and space. In some embodiments, this approach may serve to disrupt the boundary layer near the wall. In this way, three-dimensional fluctuations of the velocity field may be introduced, which are characteristic of turbulent flow and mixing may become more efficient. Similar mixing improvements have been observed during experiments in microconduits, where up to three side channels were used to impose cross flows to the main velocity field.

In the exemplary embodiment depicted in FIG. 1a, the cross flow may promote mixing in the radial direction, a characteristic absent in the case of laminar duct flow. In some embodiments, a velocity of the liquid permeated through the pores can be as high as 100-500 µm/s. The time necessary for convection in the radial direction may be comparable to the residence time of the liquid inside the fibers. In some embodiments, however, such a condition may not be present when the tube side fluid is dispersed in the shell side of porous hollow fiber devices.

Embodiments of a membrane hollow fiber crystallizer (MHFC) may include features that are the same as or similar to the features found in polymeric hollow fiber heat exchangers and/or solid hollow fiber crystallizers. For example, a high surface area/volume ratio may be employed to maximize the product yield on an equipment volumetric basis. In another embodiment, control of flow conditions and residence time may be achieved when the operating design/system shown in FIG. 1a is used. In operating the design/system of FIG. 1a, operating parameters to be defined include the geometry (type and number of fibers used, length of the fibers, shell side diameter) of the membrane hollow fiber crystallizer and flow rates of the two streams. In some embodiments, controlling these parameters together with the shell side pressure may determine the supersaturation generation inside the membrane hollow fibers. Further, in some embodiments, upon scale-up, these parameters may be advantageously maintained the same, which offers simplicity not encountered in commercial crystallizers. Performance will generally be the same, whether operating at bench or industrial scale. For the embodiment of FIG. 1b, this may also be true with the exception that shell side flow maldistribution, channeling and bypassing can cause variations in performance. In addition, it is noted that implementations may be employed that include a shell-side cross flow configuration with any system herein described. Such orientation may be effective in reducing and/or substantially eliminating shell-side maldistribution and introduce even more vigorous mixing to the disclosed system.

In exemplary embodiments of the present disclosure, the entire length of each porous hollow fiber included in the disclosed porous hollow fiber device/system is permeable, thereby providing substantially continuous/uninterrupted permeability along the axial lengths of each such fiber. However, in alternative implementations of the present disclosure, one or more of the porous hollow fibers may include axial region(s) of impermeability. Such regions of impermeability may reduce the potential for crystallizing blockage to occur by providing non-crystallizing zones along the lengths of the porous hollow fibers. Thus, in such exemplary implementations, the porous hollow fibers may be characterized by impermeable regions that total between one-third and two-thirds of the total axial lengths thereof. The regions of impermeability may be at substantially common axial positions from fiber-to-fiber, or may be in differing axial regions. Generally, a single impermeable region is defined for each porous hollow fiber that includes such feature/function, although multiple, spaced impermeable regions may be incorporated into the disclosed porous hollow fibers without departing from the spirit or scope of the present disclosure.

To further illustrate the design, use and benefits of the disclosed antisolvent crystallization systems and methods of the present disclosure, reference is made to experimental operations and results described below.

Chemicals and Materials Utilized in Exemplary Embodiment(s)

In one embodiment, deionized water was used as the tube side liquid for the mixing experiments. Nearly saturated solutions (concentration of about 25 g/L) of L-asparagine monohydrate (99%, Fisher Scientific, Pittsburgh, Pa.) in deionized water were used during the crystallization experiments. The antisolvent circulated in the shell side of the disclosed membrane hollow fiber crystallizer (MHFC) was 2-propanol (IPA, 99%, Fisher Scientific, Pittsburgh, Pa.); isopropyl alcohol (IPA) was also used as the suspension medium for the size determination of L-asparagine crystals by laser diffraction.

Porous polypropylene hollow fibers (Celgard X-20) of 350/400 μm ID/OD (Celgard Inc., Charlotte, N.C.) were used for the fabrication of five modules. Details of the modules are given in Table 2 below. The modules included Celgard X-20 fibers having a substantially elliptical pore size of 0.03×0.1 μm, a porosity $\epsilon_m$ of 0.4 and a tortuosity of 2.4. [See, Prasad et al., "Dispersion-free solvent extraction with microporous hollow-fiber modules," *AIChE Journal*, 34(2), 177-188 (1988)] The shell side was made of FEP (fluorinatedethylenepropylene) tubing. The modules were fabricated by connecting the FEP tubing with two polypropylene male run tees (Cole Parmer, Vernon Hills, Ill.). The tube sheet was formed by potting the two ends of the male run tees with an epoxy resin ($C_4$ resin with activator D from Armstrong, Easton, Mass.). The resin was left to cure for at least 24 hrs. The outside fiber surfaces were treated with an aqueous potassium dichromate solution for 5-7 min to enhance bonding with the epoxy. The solution was prepared by dissolving 5 g of potassium dichromate in 10 ml water and 80 ml of 95.7% sulfuric acid.

TABLE 2

Geometrical Characteristics of Exemplary Membrane Hollow Fiber Crystallizers

| Module # | N | Active length (cm) | Total length (cm) | $D_s$ (cm) | Outside Area (cm²) |
|---|---|---|---|---|---|
| X-20 #1 | 23 | 19.1 | 23.5 | 0.48 | 55 |
| X-20 #2 | 23 | 30.0 | 34.0 | 0.48 | 87 |
| X-20 #3 | 23 | 19.0 | 22.9 | 0.76 | 55 |
| X-20 #4 | 23 | 29.5 | 33.5 | 0.76 | 85 |
| X-20 #5 | 11 | 29.2 | 33.2 | 0.76 | 40 |

Apparatus and Procedures in Exemplary Embodiment(s)

Figure 2:
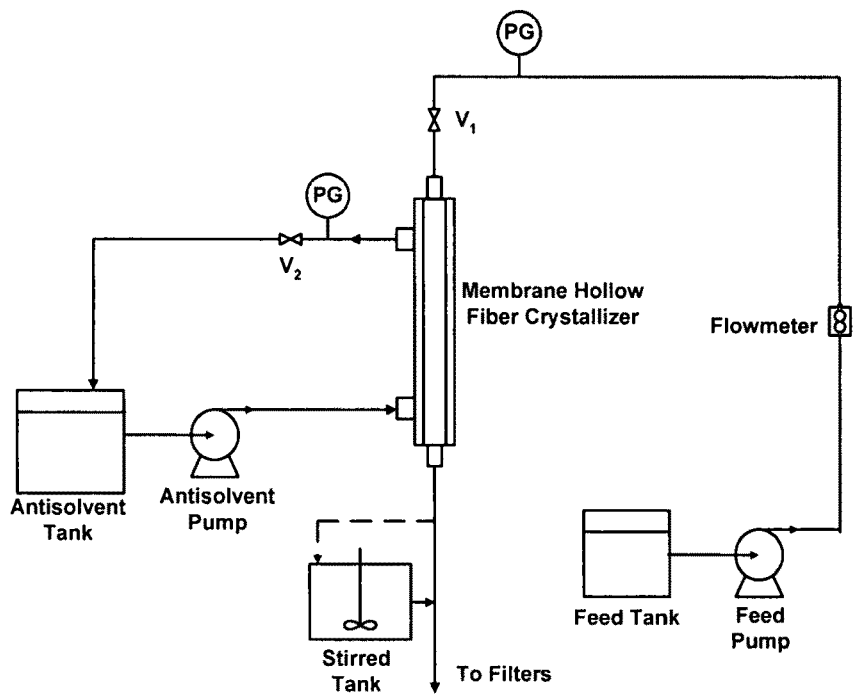
FIG. 2 provides schematics of exemplary system designs for porous hollow fiber antisolvent crystallization according to the present disclosure, wherein FIG. 2(a) show an exemplary design for achieving crystallization in the tube side
Figure 2:
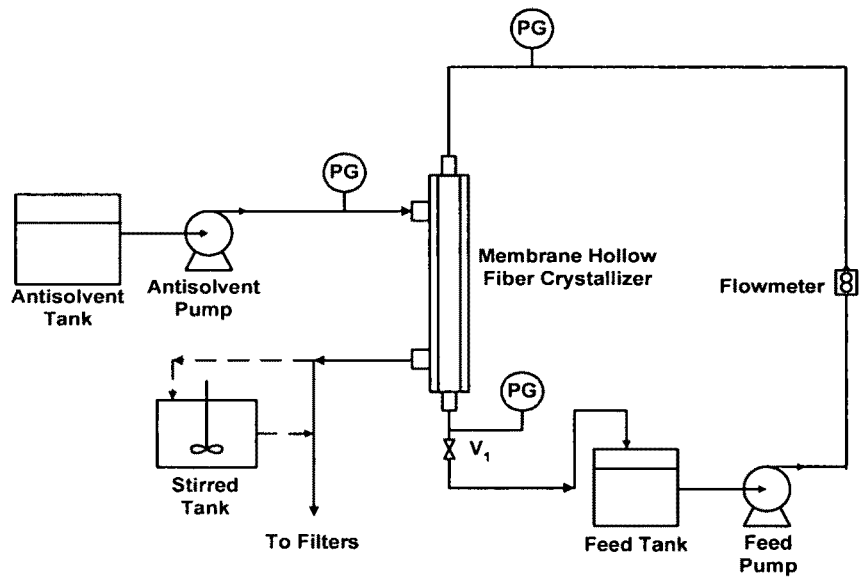

FIG. 2a illustrates an exemplary embodiment of an experimental setup used for PHFAC by crystallization in the tube side according to the present disclosure. The same setup was used for mixing experiments described herein. Therefore, the description that follows is also applicable for the mixing case with the difference that instead of a crystallizing solution, deionized water was used and no filtration or additional mixing steps were taken.

The feed solution was pumped to the lumen side of the MHFC by a peristaltic pump (Cole Parmer, Vernon Hills, Ill.). The flow rate of the feed solution was measured with a flow meter (Cole Parmer, Vernon Hills, Ill.). A check valve (V1) was positioned right before the entrance of the MHFC to prevent antisolvent leakage in the connecting tubing. The MHFC was positioned in a vertical manner to facilitate crystal removal from the hollow fibers. The antisolvent was pumped countercurrently in the shell side by a peristaltic pump (Cole Parmer, Vernon Hills, Ill.). Check valve V2 (Crum & Company, Mountainside, N.J.) was used to maintain the shell side pressure at appropriate levels. A peristaltic pump was used to induce pulsations in the shell side pressure and the permeate flow. These pulsations are known to improve mixing. They can also serve as a means to push newly formed crystals away from the inside surface of the hollow fibers. Two pressure gauges were used at the tube and shell side inlets to record the pressure head. Pressure in the shell side can be considered constant and equal to the inlet value because the pressure drop is very small. The tube side exit pressure was in all cases 1 bar.

Each crystallization run described herein was performed as follows. The flow rate and inlet head were measured without any antisolvent being circulated at the shell side. Upon startup, deionized water was circulated to avoid crystallization in the small space between the inlet of the MHFC and check valve V1. After 5-10 min, the antisolvent flow was initiated in the shell side and permeation of IPA under the prevailing transmembrane pressure difference started. The flow rate of the tube side exit stream was measured at appropriate time intervals and samples were obtained and analyzed by GC for IPA concentration. After 30-35 min, steady state permeation conditions were established inside the MHFC. At that time, the feed flow was switched to the crystallizing solution. Sampling and flow rate measurements were continued to determine any changes in antisolvent flux and the composition of the lumen side exit stream.

Periodically, the feed exit stream from the MHFC was treated in a manner similar to that recently described for solid hollow fiber cooling crystallization (See, Zarkadas et al., "Solid Hollow Fiber Cooling Crystallization," *Industrial & Engineering Chemistry Research*, 43(22), 7163-7180 (2004), the content of which is hereby incorporated by reference). Directing the feed outlet stream immediately to the filters, the MHFC once through mode of operation is obtained. Alternatively, the solution exiting the MHFC was collected in a completely stirred tank (CST), agitated for 1-2 min and then filtered. This is referred to herein as the MHFC-CST in series operation mode. During all experimental runs described herein, the CST was operated in a semi-batch mode. Note for alternate embodiments, other mixing devices, e.g., static mixers, can also be used.

Crystals obtained on the filters were thoroughly dried and then weighed. The volume of filtrate collected was also measured to obtain the magma density of the suspension exiting the experimental setup. Two kinds of filters were used throughout the experimental runs described herein: glass fiber filters (Whatman 934-AH) with a cutoff size of 1.5 μm and hydrophilized PVDF membranes (Pall Corp., NY) with a cutoff size of 0.2 μm.

FIG. 2b provides a schematic illustration of an exemplary embodiment of an experimental setup used for PHFAC in the shell side, which is similar to the embodiment described with reference to FIG. 2a. The major difference is that in the configuration of FIG. 2b, the lumen side of the MHFC is pressurized by check valve V1. Also, an additional pressure gauge was placed in the tube side exit of the MHFC and the crystallizing solution was recycled to the feed tank. Finally, the antisolvent was pumped cocurrently with respect to the crystallizing solution to facilitate the removal of newly formed crystals.

The experimental procedure for an exemplary embodiment is further described below. First, the tube side solution was pressurized, the solution was left to permeate to the shell side for about 5 min, and the flow rate of the permeate was measured. Then, the antisolvent pump was turned on at a high speed to ensure quick removal of the solution already filling the shell side. Subsequently, the antisolvent flow rate was adjusted at appropriate operating levels, about 10 times higher than the permeate flow rate. Such difference was necessitated according to the experimental runs described herein solely by the geometrical design of the male run tees used in the fabrication of the MHFCs, which promotes blocking phenomena at the shell side exit. The shell side exit stream was treated again in one of two ways: the exit stream was either directed immediately to the filters in an once through mode or collected in a semi-batch CST, stirred and then filtered.

Analytical Methods Employed in Exemplary Embodiment(s)

In one embodiment, the feed concentration of L-asparagine monohydrate aqueous solutions was determined gravimetrically for all runs. The concentration of 2-propanol was determined based on two methods. The first method was based on density measurements, which were performed with an Anton-Paar DMA-46 (Anton Paar, Graz, Austria) density meter at 25° C. This technique was used to obtain the % weight concentration of IPA in the feed exit stream. The dependence of the % weight IPA concentration of aqueous IPA solutions on density was obtained from the literature. The second technique used was gas chromatography. Analysis was performed in an HP 6890 series gas chromatography system equipped with a HP 7694 automated headspace sampler (Agilent Technologies, Palo Alto, Calif.). A polar column 30 m×0.0530 mm×1.0 μm film thickness was used (Innowax 19092N-123, Agilent Technologies, Palo Alto, Calif.).

Crystal sizing was performed with a Coulter LS-230 laser diffraction instrument. In all measurements an optical model based on the complete Mie theory was used. The refractive index of the suspension medium was measured between 20-28° C. with an Abbe-3L refractometer with a precision of 0.0001 refractive index units. The suspension medium used for crystal sizing was isopropanol. The refractive index of L-asparagine monohydrate was determined to the third decimal place by the method of oblique illumination. The shape factor of L-asparagine monohydrate crystals was taken equal to 1.20 based on data quoted in the literature. L-asparagine monohydrate crystals were found to form loose agglomerates. The latter were destroyed by mild sonication prior to measurement.

Comparison with Literature Data

All literature comparisons were made on the basis of the same supersaturation. The CSD quantities compared include the mean crystal size $L_m$, its standard deviation (SD), the coefficient of variation (CV), the mode size, and the $d_{10}$, $d_{50}$ and $d_{90}$ sizes, which are the sizes corresponding to the $10^{th}$, $50^{th}$ and $90^{th}$ percentiles, respectively, of the undersize volume cumulative crystal size distribution. Using these parameters ensures that the comparison is as complete as possible and yields meaningful results. The mean size, its SD and the CV of the CSD are given from the following relationships based on population density values:

$$L_m = \frac{\int_{L_1}^{L_2} L^4 n(L)\,dL}{\int_{L_1}^{L_2} L^3 n(L)\,dL} \quad (1)$$

$$SD = \sqrt{\frac{\int_{L_1}^{L_2} (L - L_m)^2 L^3 n(L)\,dL}{\int_{L_1}^{L_2} L^3 n(L)\,dL}} \quad (2)$$

$$CV = \frac{SD}{L_m} 100\% \quad (3)$$

Another quantity compared was the nucleation rate. The latter was calculated as $$B_o = \frac{\int_{L_1}^{L_2} n(L)\,dL}{t_{samp}} \quad (4)$$

Integration was performed in all cases by using the composite trapezoidal rule. Population densities for the PHFAC runs were obtained from the following relationship based on the % volume CSD determined by the laser diffraction measurements:

$$n_1(L_i) = \frac{x_{w,i} M_T}{k_v \rho_c L_i^3 \Delta L_i} \quad (5)$$

Equation (5) is based on the assumption that the weight fraction of crystals of size $L_i$ is the same as the volume fraction found from the laser diffraction measurements. The magma density necessary for the calculations was determined experimentally by:

$$M_T = \frac{m_c}{V_{fil}} \quad (6)$$

In the case of literature data, supersaturations were calculated based on quoted supersaturation ratios and the solubility curve. Literature CSD data were acquired by laser diffraction measurements. Therefore, a comparison with the data obtained in this study is straightforward. CSD information was obtained in the form of the population density curve. The latter was obtained from diagrams read with digital imaging software (Image Tool version 3, Univ. of Texas Health Science Center in San Antonio, Tex.) with an accuracy of 1-2%. Mean size, SD and CV were calculated from equations (1)-(3) with numerical integration between the lower and upper sizes reported. The % weight crystal size distributions, which are directly comparable to the % volume crystal size distributions measured by laser diffraction, were generated based on the following relationships:

$$W_i(L_i) = n_i(L_i) k_v \rho_c L_i^3 \Delta L_i \quad (7)$$

$$x_{w,i} = \frac{W_i(L_i)}{\sum_i W_i(L_i)} \quad (8)$$

The % weight cumulative curve was then constructed and used to find the $d_{10}$, $d_{50}$ and $d_{90}$ sizes with interpolation. Nucleation rates were obtained either by quoted values or equation (4) for stirred crystallizers and by graphs for tubular precipitators.

Mixing Experiments in Exemplary Embodiment(s)

In one embodiment, a MHFC may be used as described below. Mixing experiments of isopropanol (shell side) and water (tube side) in porous hollow fiber devices were performed with two goals. The first goal was to determine the maximum achievable supersaturation in a MHFC based on the final IPA concentration and the solubility curve of L-asparagine monohydrate in aqueous isopropanol solutions. The second goal was to determine the dependence of the IPA concentration at the tube side outlet on the main operating parameters: the tube side flow rate and the transmembrane pressure. The latter was calculated by:

$$\Delta P_m = \frac{(P_{s,in} - P_{t,in}) + (P_{s,out} - P_{t,out})}{2} \quad (9)$$

Figure 3:
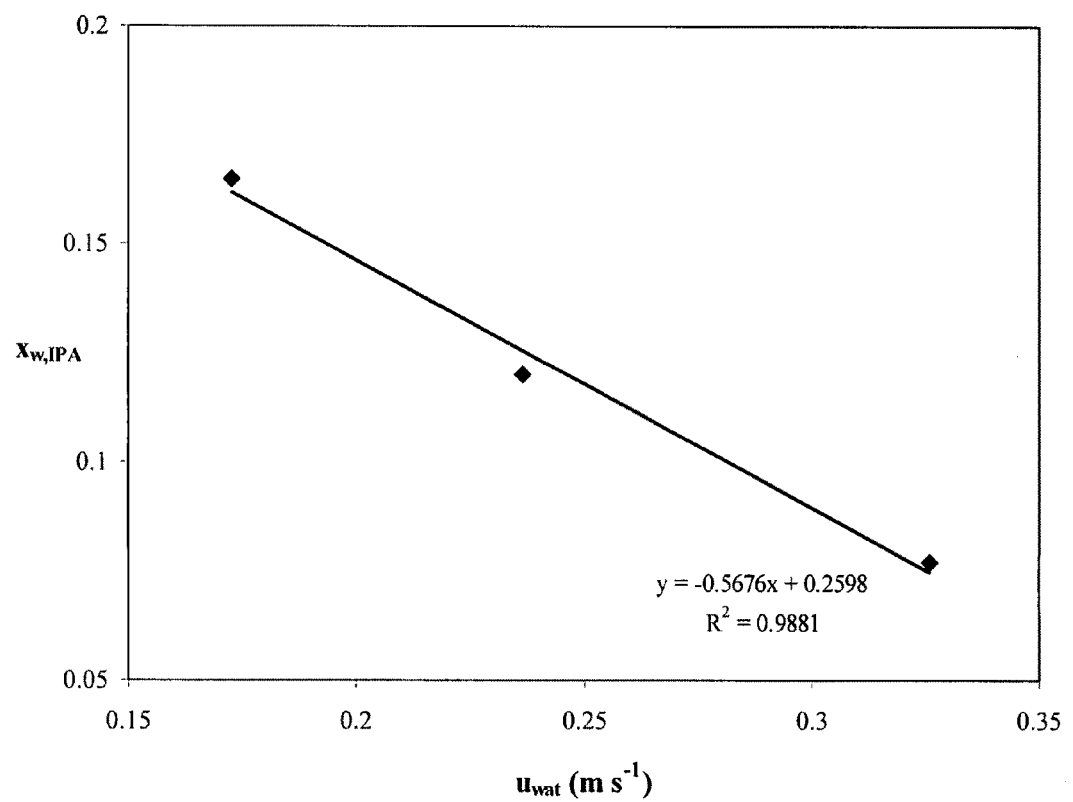
FIG. 3 is a plot of weight fraction of isopropyl alcohol (IPA) in the tube side exit stream as a function of water flow rate.

FIG. 3 shows a plot of the weight fraction of IPA in the tube exit stream as a function of the water velocity for three runs performed at the same shell side pressure. It is apparent that the net result of keeping the shell side pressure constant and increasing the water flow rate is to reduce the IPA concentration in the exit stream. If crystallization experiments were performed, high supersaturations or equivalently high mass transfer rates would be obtained only when the crystallizing solution flow rate is kept low. In this sense, the problem of rating porous hollow fiber devices as mass exchangers is very similar to the rating problem of porous hollow fiber heat exchangers: higher efficiency and small HTU (height of a transfer unit) values are obtained for constant driving force (temperature difference or transmembrane pressure) as the tube side Reynolds number decreases. FIG. 3 also shows that high IPA weight fractions in the tube outlet stream can be achieved in porous hollow fiber devices. Therefore, the latter could be potentially used to perform liquid phase reactions on a 1:1 or 2:1 stoichiometric ratio.

Figure 4:
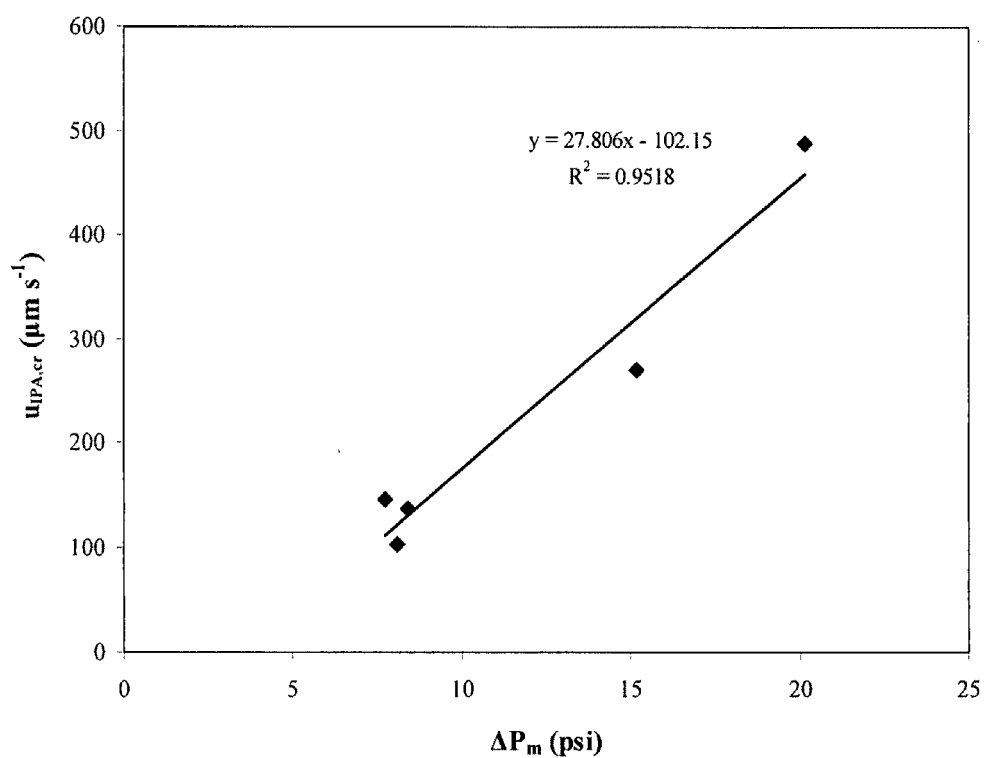
FIG. 4 is a plot of cross flow permeation velocity of IPA in porous hollow fiber devices as a function of transmembrane pressure.

FIG. 4 illustrates the cross flow permeation velocity of IPA achieved during the mixing experiments. The cross flow velocity of the permeate was calculated by:

$$u_{AS,cr} = 4J_{As} \frac{D_o}{(D_o + D_i)} \frac{\tau_m}{\varepsilon_m} \quad (10)$$

where:

$$J_{AS} = \frac{C_{AS}}{1 + C_{AS}} \frac{\dot{m}_{tot}}{\rho_{AS}} \frac{1}{N \pi D_o L} \quad (11)$$

is the antisolvent flux. Equation (10) is based on the assumption of pores of a circular cross section without any constriction or enlargement, which however can be tortuous. Although such pore morphology is idealized, it is closer to reality; the pore volume depends more on the membrane tortuosity compared to its local diameter.

The derivation of Equation (10) is given as follows: The cross flow velocity of an antisolvent exiting the pores of a membrane can be calculated by:

$$u_{AS,cr} = \frac{V'_{AS}}{A_{p,tot}} = \frac{J_{As} A_m}{N_p \pi \frac{d_p^2}{4}} = \frac{J_{As} N \pi D_o L}{N_p \pi \frac{d_p^2}{4}} \Rightarrow u_{AS,cr} = \frac{4J_{As} N D_o L}{N_p d_p^2} \quad (12)$$

The number of pores of the membrane is then calculated to obtain a measure of the cross flow velocity. This task is performed by assuming pores of circular cross section with no constrictions or enlargements, which can be tortuous, as noted above. This model becomes equivalent to the straight cylindrical pore model if $\tau_m = 1$. Advantageously, this approach can account for the additional pore volume induced by the tortuous nature of the pores. The total volume of the pores can be found based on the membrane porosity and its total volume:

$$V_{p,tot} = N_p V_p = \varepsilon_m V_m = \varepsilon_m N \pi \frac{D_o^2 - D_i^2}{4} L \quad (13)$$

The volume of an individual pore is given by $$V_p = \pi d_p^2 \frac{D_o - D_i}{4} \tau_m \quad (14)$$

The number of pores is then found by combining Equations (13) and (14):

$$N_p = \frac{V_{p,tot}}{V_p} = \frac{\varepsilon_m N \pi \frac{D_o^2 - D_i^2}{4} L}{\pi d_p^2 \frac{D_o - D_i}{4} \tau_m} \Rightarrow N_p = \frac{\varepsilon_m N (D_o + D_i) L}{d_p^2 \tau_m} \quad (15)$$

Substituting Equation (15) in Equation (12), the final form of the sought relationship is obtained:

$$u_{AS,cr} = \frac{4J_{AS} N D_o L}{\frac{\varepsilon_m N (D_o + D_i) L}{d_p^2 \tau_m} d_p^2} \Rightarrow u_{AS,cr} = 4J_{As} \frac{D_o}{(D_o + D_i)} \frac{\tau_m}{\varepsilon_m} \quad (16)$$

It is evident from FIG. 4 that the cross flow velocity of the permeate is appreciable, especially if one considers the diameter of the fibers used. Therefore, the cross flow velocity distorts the parabolic velocity profile of the main tube side stream, thereby creating three-dimensional velocity fluctuations and enhanced radial mixing.

Figure 5:
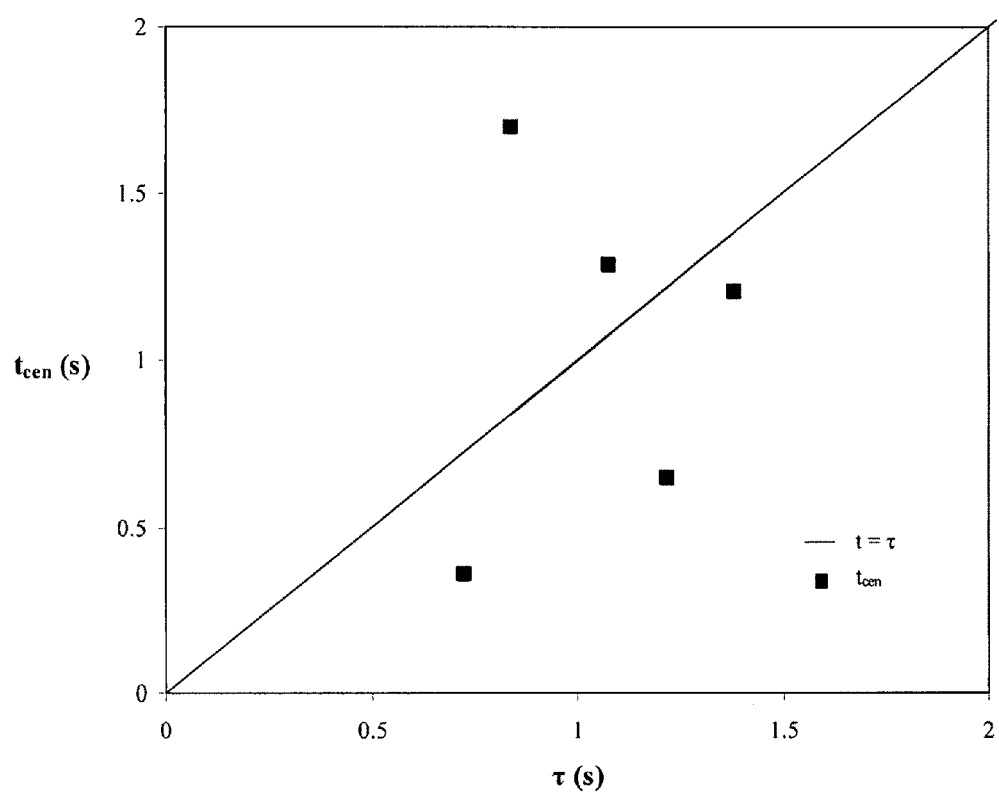
FIG. 5 is a plot of radial mixing time scale vs. mean residence time inside a membrane hollow fiber crystallizer (MHFC) in the tube side according to the present disclosure.

The cross flow velocities shown in FIG. 4 permit radial mixing on a time scale that is comparable to the mean residence time of the tube side fluid inside the MHFC. FIG. 5 shows a plot of the time required for the permeate to be convectively transported to the hollow fiber centerline with respect to the mean residence time. The former is found from:

$$t_{cen} = \frac{D_i}{2} \frac{1}{u_{AS,cr}} \qquad (17)$$

For most of the experimental runs performed, this time is 1-2 times smaller than the mean residence time inside the device. This result further demonstrates that radial mixing in porous hollow fiber devices is significant.

In an exemplary embodiment of the present disclosure, radial mixing can also be improved by using higher transmembrane pressures, longer devices and/or lower tube side velocities. In this aspect, the radial mixing problem in porous hollow fiber devices is similar to the heat transfer rating problem for polymeric hollow fiber heat exchangers (PHFHEs). Indeed, the analogy between transmembrane pressure and temperature difference is straightforward.

Figure 6:
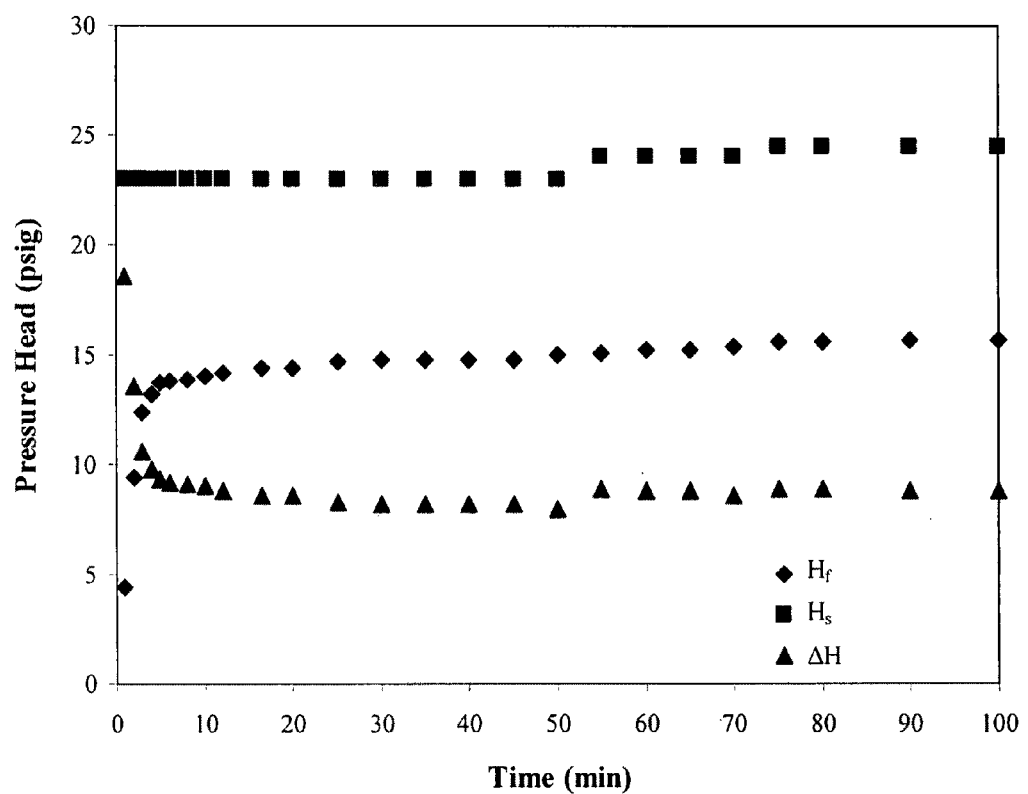
FIG. 6 is a plot of pressure head profiles in a membrane hollow fiber crystallizer (MHFC) as a function of time [Module X-20#2, $x_{w,IPA}$=0.275, $\Delta P_m$=15.2 psi, $u_t$=0.25 m/s].

Further insight on the mixing achieved inside the hollow fibers according to the present disclosure can be obtained from FIG. 6, which illustrates the pressure head profiles in both sides of the MHFC as well as the total head difference at the inlet of the MHFC as a function of time. FIG. 6 shows an increase in the tube side pressure head, which is more than 10 times the value before IPA permeation started. This difference cannot be explained only on the basis of the additional flow induced by the permeation of IPA. The latter was only about 50% of the initial water flow rate. Another reason for increased pressure drop in the tube side is the higher viscosity of aqueous IPA solutions compared to pure water. For the IPA weight fraction obtained during the experimental run shown in FIG. 6, the viscosity of the final mixture is about 3 times higher than water. The pressure drop according to Hagen-Poiseuille law is given by $$\frac{\Delta P}{L} = \frac{128 \mu \dot{V}}{\pi D^4} \qquad (18)$$

Equation (18) shows that the increased viscosity and flow rate due to IPA permeation have a synergistic effect. However, this could increase the total head by a factor of 4 or 5, which is still lower than the increase observed in practice. The additional pressure drop observed is possibly caused by the flow of IPA perpendicular to the direction of the main flow. This cross flow distorts the laminar velocity profile assumed in the derivation of Hagen-Poiseuille's law and does not allow for its complete development. Therefore, higher pressure drops are obtained since the flow is developing. In addition, the cross flow creates three-dimensional fluctuations of the velocity field, which are characteristic of turbulent flow and could possibly cause an earlier transition to turbulence. The latter phenomenon has already been claimed as a source of higher friction factors in microchannels without any cross flows entering the system.

Crystallization of L-Asparagine Monohydrate in Exemplary Embodiment(s)

Results of exemplary crystallization runs of L-asparagine monohydrate from aqueous solutions are described herein. It is noted that this system has been studied in the literature in batch stirred crystallizers and tubular precipitators. Therefore, a first comparison of PHFAC with antisolvent stirred crystallizers and tubular precipitators is described herein. The results obtained with crystallization in the tube side and results for crystallization in an opposite operational mode, i.e., crystallization in the shell side, are described herein.

Figure 7:
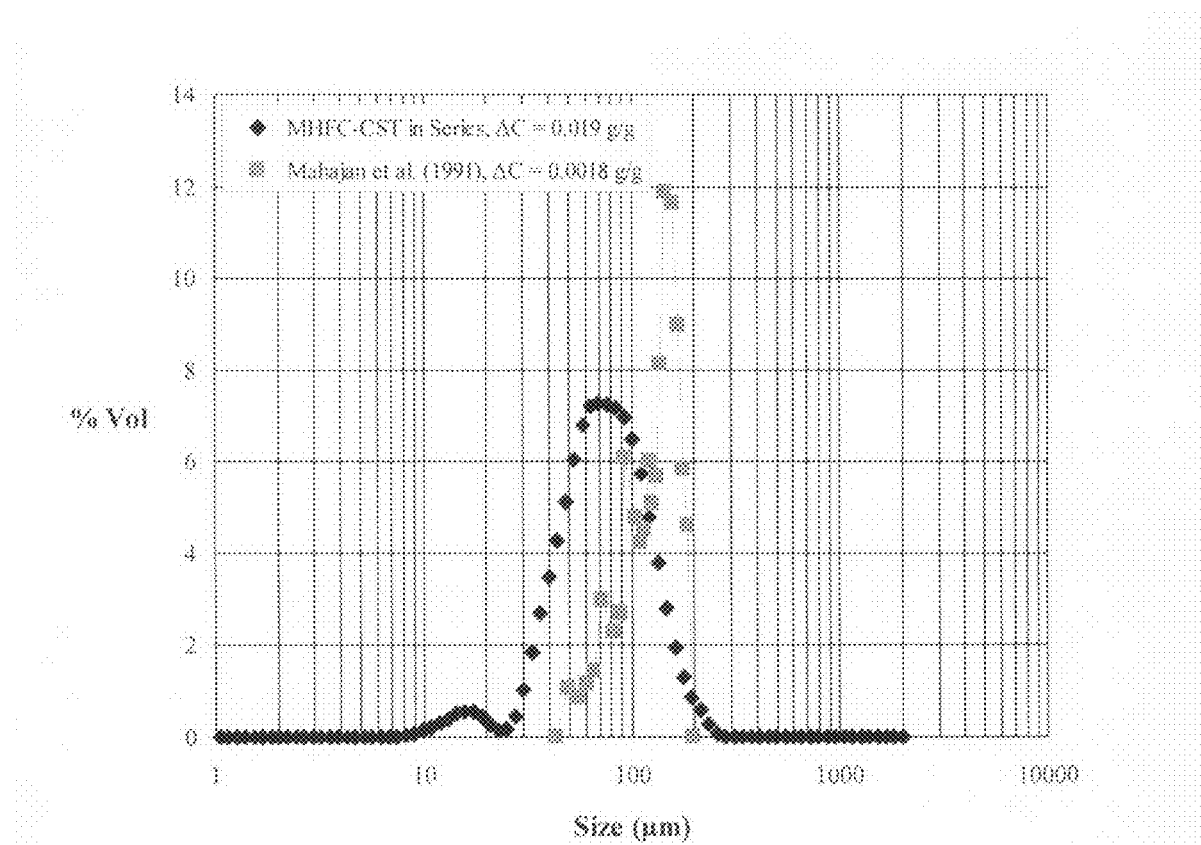
FIG. 7 is a plot of differential crystal size distribution (volume percent) for IPA-based antisolvent crystallization of L-asparagine monohydrate in porous hollow fiber devices according to the present disclosure. [Crystallization in tube side; Module Celgard X-20#2, $u_t$=0.3 m s$^{-1}$, $\Delta C$=0.019 g/g.]

FIG. 7 shows a % volume differential curve obtained for an experimental run performed with crystallization in the tube side and the MHFC-CST in series operation mode. The sample was obtained 10 min after the flow at the tube side was switched from water to the L-asparagine solution. The experimental results were achieved using the Celgard X-20#2 module at operating conditions of $u_t$=0.3 m s$^{-1}$ and $\Delta C$=0.019 g/g. One experimental run was conducted in a batch stirred crystallizer. [Mahajan et al., "Analysis of size distribution and growth kinetics during the batch crystallization of L-asparagine," *AIChE Symposium Series*, 87(284), 143-157 (1991).] The batch run was obtained at approximately the same IPA concentration, but at a lower L-asparagine concentration in the aqueous solution. Therefore, the supersaturations involved in the two runs were quite different and the comparison can only be qualitative.

FIG. 7 shows that the plot for one embodiment—the CSD—is reasonably symmetric with the exception of a small peak at around 15 μm. This was also confirmed by a relatively low coefficient of variation of 46%. Second, most crystals produced are below 100 μm and the whole CSD is confined below 200 μm. Consequently, the results set forth in FIG. 7 demonstrate that the disclosed PHFAC offers advantageous CSD control. Comparing the curve obtained in the PHFAC operation to that in a batch stirred vessel, it is apparent that the former is shifted towards smaller sizes.

Figure 8:
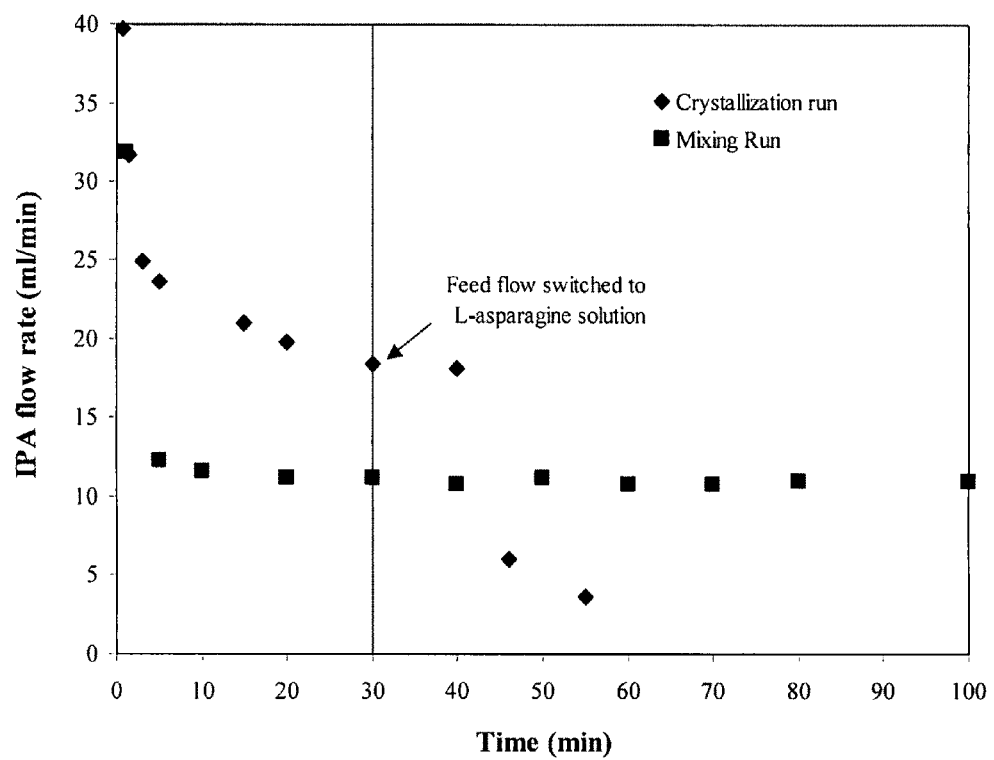
FIG. 8 is a plot comparing isopropyl alcohol (IPA) flow rate as a function of time for crystallization and mixing experimental runs. [Permeation to tube side, operating conditions as summarized with respect to FIG. 7.]

In some exemplary embodiments, a decrease in the IPA permeation rate to the tube side, was experienced shortly after the crystallizing solution was passed through the tube side. This result is shown in the plot of FIG. 8. A similar curve is also given for of a mixing experiment, during which no solute was present. The two runs were performed under slightly different shell side pressures; however, a direct comparison of the shape of the curves is pertinent. It is apparent from FIG. 8 that the presence of the solute results in a sharp decrease in the antisolvent permeation rate in a rather short time after its introduction to the crystallizer. Such a decrease was not experienced during the mixing experiment; rather, the permeation rate remained steady throughout the run. The same behavior was observed for two additional runs performed.

In one such embodiment, the decrease of the antisolvent permeation rate leads to a situation where the supersaturation generated decreases with time. Clearly, this phenomenon is undesirable and is also one of the weaknesses of other membrane-based crystallization techniques, namely, reverse osmosis, membrane distillation and precipitation in membrane reactors. Pore blockage by crystals formed near the wall seems to be the most plausible explanation for the experimental behavior observed.

Figure 9:
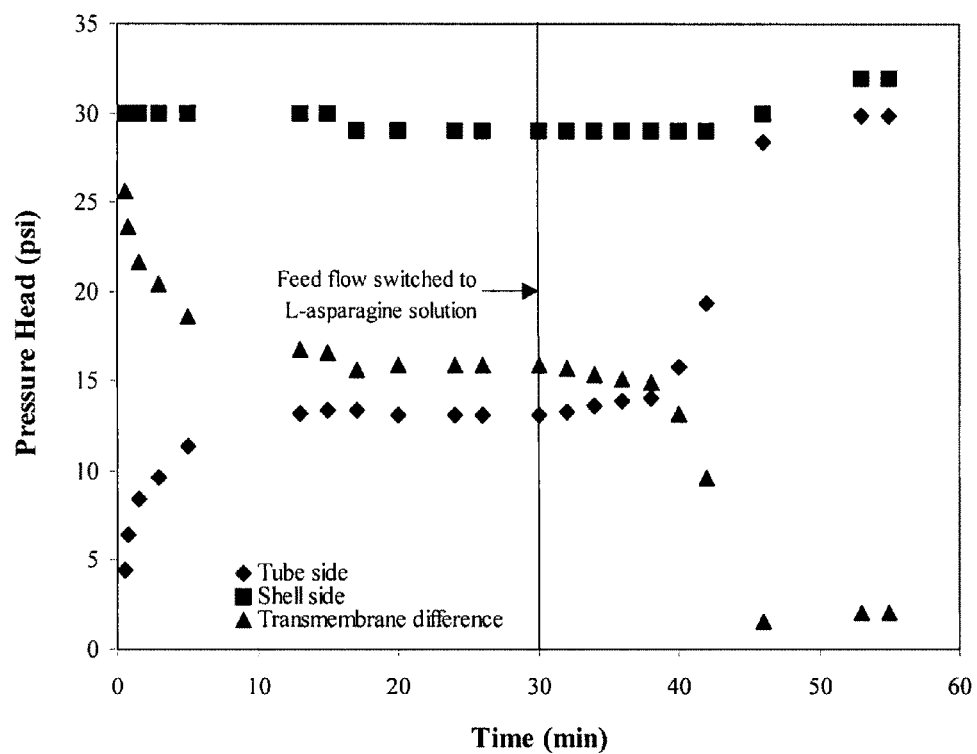
FIG. 9 is a plot of pressure head profiles as a function of time for antisolvent crystallization of L-asparagine monohydrate in porous hollow fiber devices according to the present disclosure. [Permeation of antisolvent to tube side, operating conditions as summarized with respect to FIG. 7.]

More insight on the mechanism that leads to antisolvent flux decline can be gained from FIG. 9, which shows the pressure head profiles obtained during the crystallization runs presented in FIGS. 7 and 8. Comparing FIGS. 8 and 9, it is evident that the antisolvent permeation rate decrease is accompanied by a corresponding decrease in the transmembrane pressure and an increase of the tube side pressure head. These trends cannot be explained in terms of pore blockage only. They also cannot be rationalized based on the corresponding increase of the tube side pressure head during the mixing experiments. In the crystallization run, the viscosity of the final solution decreases with time due to the lower IPA concentration and the total flow rate also decreases with time due to the decreased IPA permeation rate. Consequently, according to Equation (18), the pressure drop inside the fibers and hence the pressure head should decrease, unless there is a considerable rise in the solution viscosity due to precipitation. The only other mechanism to explain the increased resistance to flow observed is gradual fiber blockage. A similar phenomenon was also observed in the case of crystallization by reverse osmosis and it may limit the applicability of PHFAC in certain systems to crystallization in the tube side.

Figure 10:
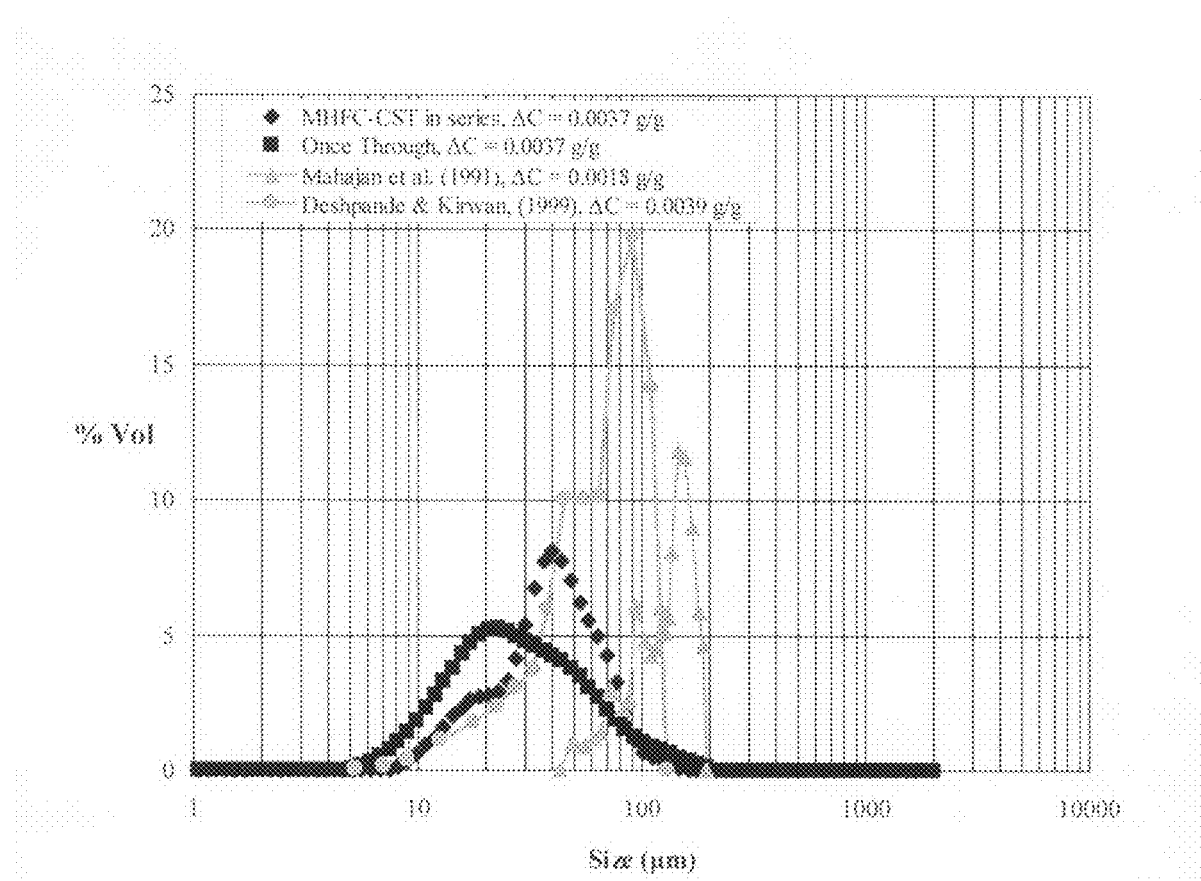
FIG. 10 is a plot of differential crystal size distributions for antisolvent crystallization of L-asparagine monohydrate in porous hollow fiber devices (% volume vs. size) as compared to controls. [Crystallization in shell side; IPA flow rate=3.90 ml/s, L-asparagine permeation flow rate=0.48 ml/s.]
Figure 11:
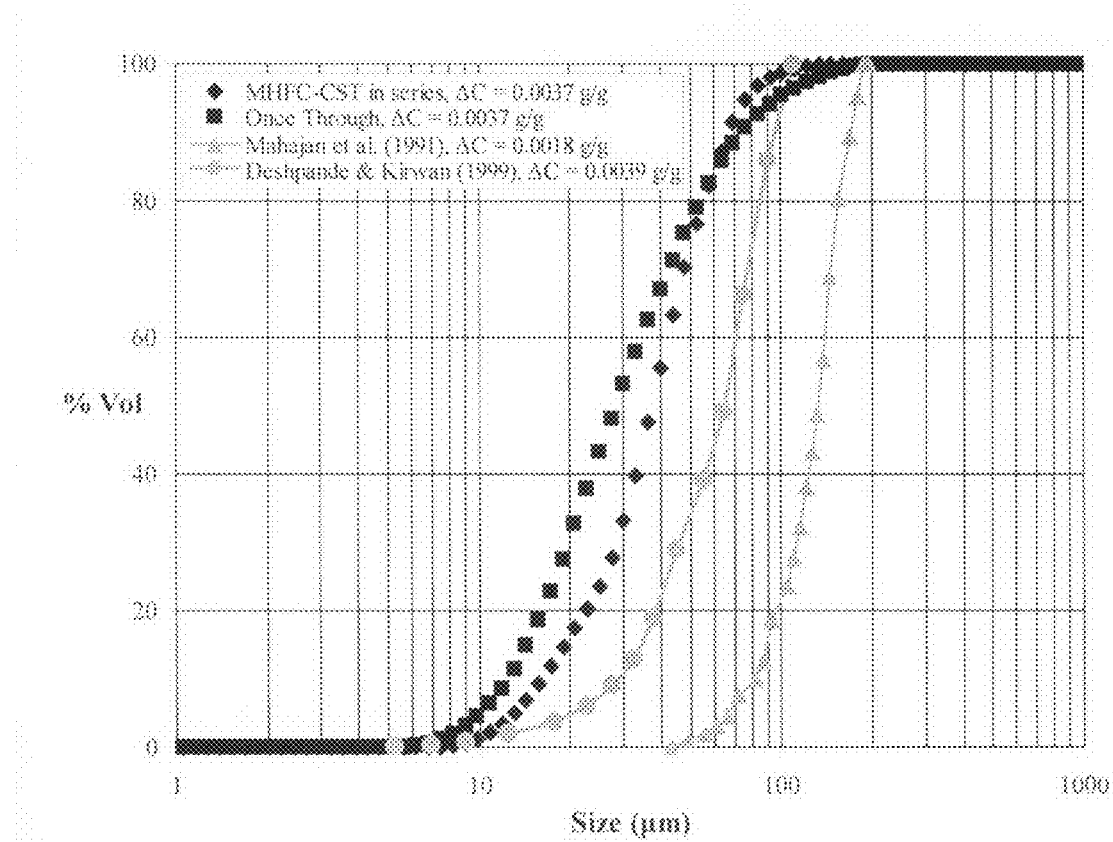
FIG. 11 is a plot of cumulative undersize crystal size distributions for antisolvent crystallization of L-asparagine monohydrate in porous hollow fiber devices (% volume vs. size) according to the present disclosure as compared to controls. [Crystallization in shell side; operating conditions as summarized with respect to FIG. 10.]

FIGS. 10 and 11 show embodiments in the typical % volume differential and % volume cumulative undersize CSDs, respectively, for PHFAC runs with crystallization in the shell side. Two curves are shown: one for the MHFC-CST in series and one for the once through operation mode. Also included are two curves obtained from the literature for runs performed in batch stirred crystallizers. [Mahajan (1991); Deshpande et al., "Effect of mixing on size distribution during precipitation of L-asparagine in an agitated crystallizer," *Proceedings of the 14th International Symposium on Industrial Crystallization*, Cambridge, UK, 340-348 (1999).] Data at the same supersaturation are available and the comparison between PHFAC and the literature data can assess quantitative differences between the two techniques. In one embodiment, despite the fact that the crystallizing solution is fed to an antisolvent environment, the quoted final supersaturations are relatively low. This may be attributed to the high antisolvent flow rate used. Such flow rates may be necessary to avoid clogging of the shell side exit for certain system designs. Thus, for example, the male run tees used in the disclosed experimental runs for the MHFC system had openings that were much narrower than the nominal shell side diameter. In some embodiments, if different fittings or a different shell side configuration were used to adjust the antisolvent flow rate, then higher supersaturations and consequently higher yields could be obtained.

FIG. 10 shows an embodiment that, in once through operation mode, the distribution is smaller compared to the MHFC-CST in series run. However, the CSD is broader, as evident from its tail at larger sizes. The embodiment of FIG. 11 further supports these observations. Indeed, smaller crystal sizes are obtained up to the $70^{th}$ percentile with considerable broadening occurring at the high end of the CSD due to localized growth. This result is in accordance with the theoretical results of Garside and Tavare [Garside et al., "Mixing, reaction and precipitation: Limits of micromixing in an MSMPR crystallizer," *Chemical Engineering Science*, 40(8), 1485-1493 (1985)] and Tavare [Tavare, "Micromixing limits in an MSMPR crystallizer," *Chemical Engineering Technology*, 12, 1-12 (1989)].

In once through operation mode, the MHFC is more closely approximated by plug flow. In the MHFC-CST operating in series mode, the PHFAC experimental assembly can be considered as a partially segregated MSMPR crystallizer. For the low levels of supersaturation involved during the experimental runs shown in FIGS. 10 and 11, this simply means that it may be necessary to anticipate smaller median and smaller mode sizes in once through operation. The opposite would be true for higher supersaturations. In addition, the presence of the CST increases the overall residence time of the crystals inside the apparatus and, as a result, their sizes.

The embodiments shown in FIGS. 10 and 11 also show that the MHFC produces smaller crystals compared to batch stirred vessels. The median size obtained in the PHFAC setup is 41 μm compared to 61 and 126 μm for the stirred crystallizer, a two- and three-fold difference, respectively. [Deshpande (1999) and Mahajan (1991), respectively.] This can be attributed to the segregation effects induced by the MHFC. Tavare (1989) has shown that such effects are responsible for lower median sizes at a constant supersaturation generation rate. In addition, FIG. 11 illustrates that the CSDs obtained may be confined below 100 μm, a range especially useful for crystalline pharmaceutical products for which bioavailability often dictates the desired CSD.

Figure 12:
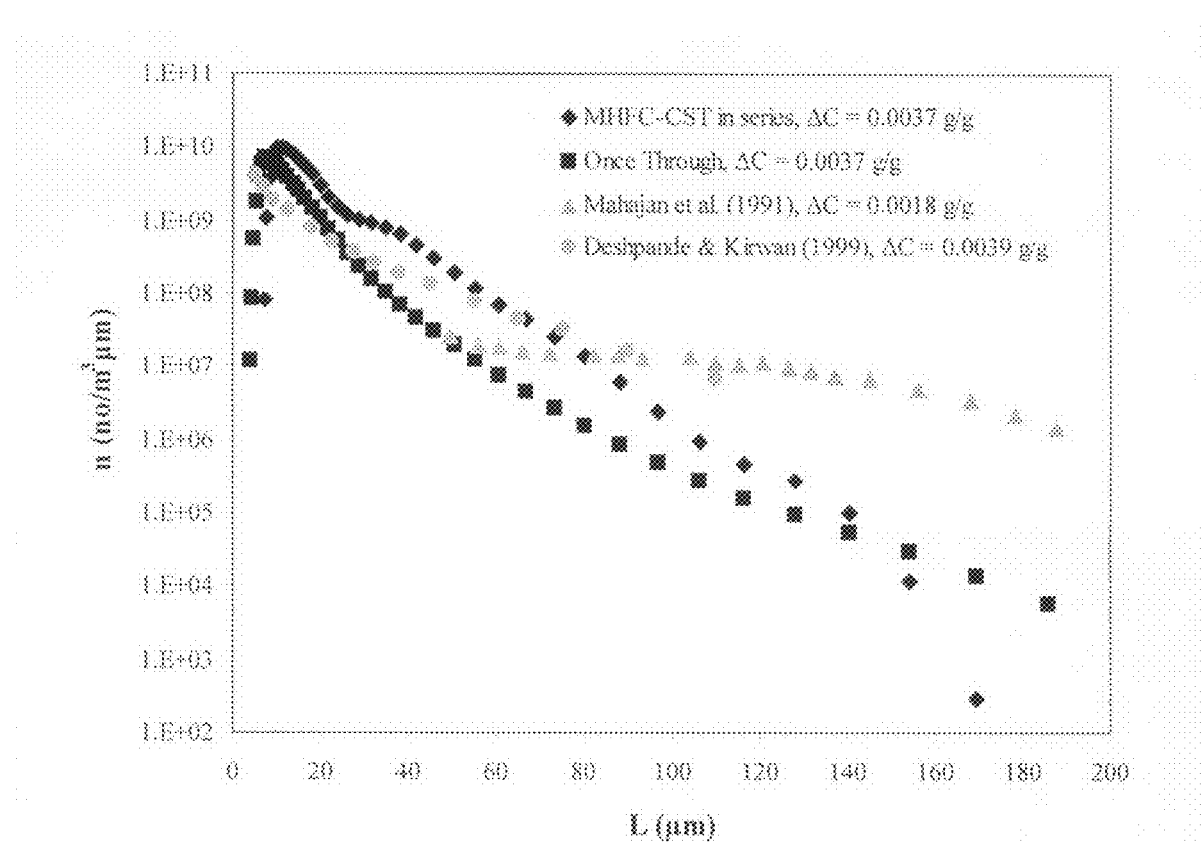
FIG. 12 is a plot of population densities for antisolvent crystallization of L-asparagine monohydrate in porous hollow fiber devices according to the present disclosure as compared to controls. [Crystallization in shell side' operating conditions as summarized with respect to FIG. 10.]

In one embodiment, the segregation effect introduced by the MHFC is clearly shown in FIG. 12, where the population density curves for the runs of FIGS. 10 and 11 are presented. There is a characteristic maximum in both curves. This phenomenon has been observed numerous times for products obtained in industrial stirred crystallizers and has been modeled and explained as the effect of a plug flow zone inside the crystallizer. The same behavior, albeit less pronounced, has also been observed for solid hollow fiber cooling crystallization. Compared to the batch stirred vessel, both experimental PHFAC runs produced a higher number of smaller crystals. This may be attributed to higher nucleation rates during the PHFAC runs.

In other embodiments, a more comprehensive examination of the CSD characteristics obtained during the PHFAC runs with crystallization in the shell side was undertaken. In one embodiment, the male run tees used to fabricate the MHFCs had openings that were much smaller than the nominal diameter of the shell side. These points may be susceptible to fouling and may necessitate the use of high antisolvent flow rates to prolong operational time. In addition, the ability to pack a large number of fibers in the shell side, beneficial for heat transfer and cooling crystallization, may not be optimal for the configuration described in this embodiment. In exemplary embodiments of the present disclosure, a more open arrangement may be adopted and implemented. A MHFC with a shell of rectangular cross-section, a staggered fiber arrangement in the form of flat nets spaced a few fiber diameters apart, and cross flow of the antisolvent would be a preferred design, albeit more challenging configuration to implement and test. Moreover, special consideration should be given to the design of the shell side inlet and outlet.

Figure 13:
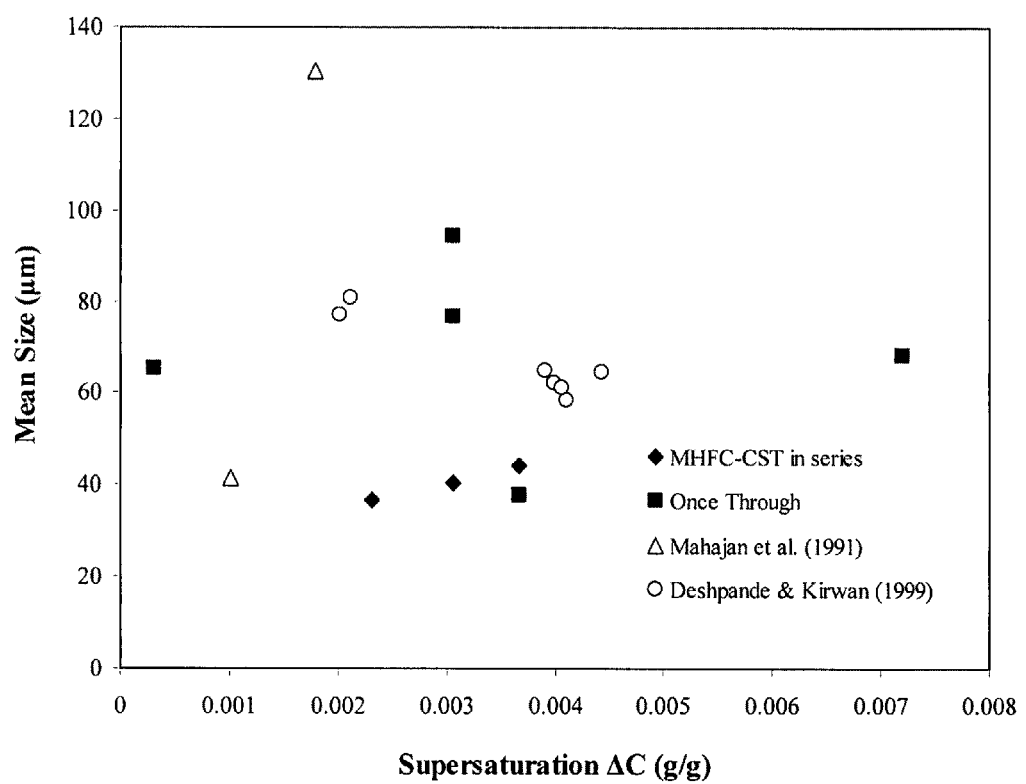
FIG. 13 is a plot of mean crystal size obtained during antisolvent crystallization of L-asparagine monohydrate in porous hollow fiber devices according to the present disclosure as compared to controls. [Crystallization in shell side.]

FIG. 13 is a plot of the mean crystal size vs. supersaturation for an exemplary embodiment of the present disclosure. The plot of FIG. 13 shows that for the disclosed embodiment, membrane hollow fiber crystallizers in combination with a downstream mixing device yield about two times lower mean crystal sizes as compared to batch stirred crystallizers. It is also evident that the presence of a mixing device downstream from the MHFC is beneficial for the disclosed embodiment. The mean size obtained in the MHFC-CST in series runs is confined between 36 and 44 μm, as compared to a range of 37-95 μm for once through operation mode. Moreover, a linear dependence of the mean crystal size on the supersaturation applied for the MHFC-CST in series runs. This linear dependence may also apply if the run presented in FIG. 7, which was performed at much higher supersaturation levels, were included.

The increase of the mean size with supersaturation may be explained in terms of two factors that act in a synergistic way. The first factor is the relatively flat nucleation rates due to the low supersaturations involved. The second factor is the increase of the crystal growth rate with supersaturation. Note also that a similar shift towards larger sizes with an increase in supersaturation has also been observed in the literature for lower supersaturations. [Mahajan (1991)]

Figure 14:
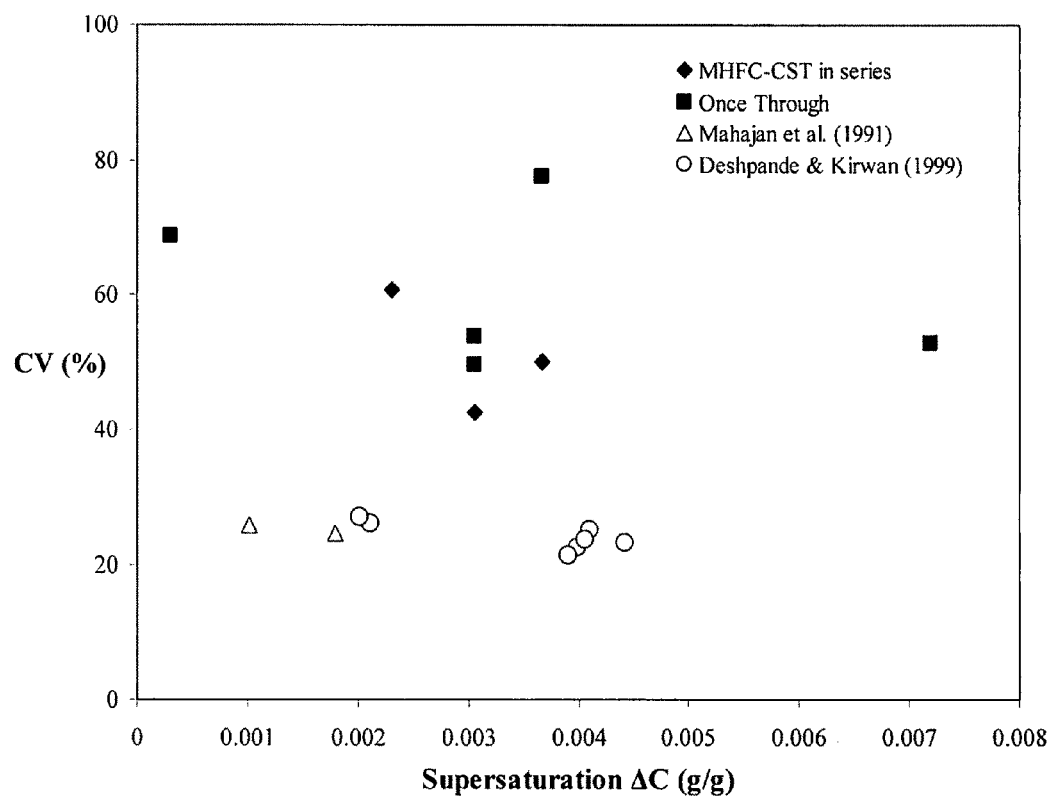
FIG. 14 is a plot of crystal size distribution as measured by coefficient of variation (CV) obtained during antisolvent crystallization of L-asparagine monohydrate in porous hollow fiber devices according to the present disclosure as compared to controls. [Crystallization in shell side.]

In some embodiments, a relationship/dependence between mean size and supersaturation is not apparent, as seen in FIG. 13 for the once through runs. This may be attributed to local supersaturation generation and depletion. The former is responsible for nucleation; once the nuclei are formed, supersaturation is quickly depleted by growth. These phenomena may be local due to the absence of substantial mixing and, when averaged for the whole device, variability in the results is obtained. As a result, much higher CV values are obtained for some embodiments, as shown in FIG. 14, as compared to the MHFC-CST in series runs. For the latter, the CV may always be lower than the theoretical limit of 50% for MSMPR crystallizers, but much higher than the values obtained in batch stirred crystallizers. However, this may be attributed to a combination of two times smaller mean sizes and similar SD values.

Similar to the trends observed above, a relationship/dependence between the median and the $d_{90}$ size on supersaturation was observed for some embodiments of the present disclosure. More importantly, however, is the fact that for some embodiments, a combination of a MHFC and a mixing device can yield distributions for which 90% of the crystals are smaller than 65-75 μm. If one considers that the MHFCs of some embodiments as tested herein were not optimally designed, these sizes are very low. Confining the CSD close to or below this limit would be sufficient for most pharmaceutical applications. The same conclusion applies to a lesser extent for the once through runs. The CSD can be confined to sizes close to or below 165 μm. These numbers compare favorably with existing literature data for L-asparagine antisolvent crystallization. The maximum size reported in MSMPR crystallizers is 300 μm, while for batch crystallization the $d_{90}$ for the majority of the data is between 85-120 μm. [Mahajan (1991)]

Figure 15:
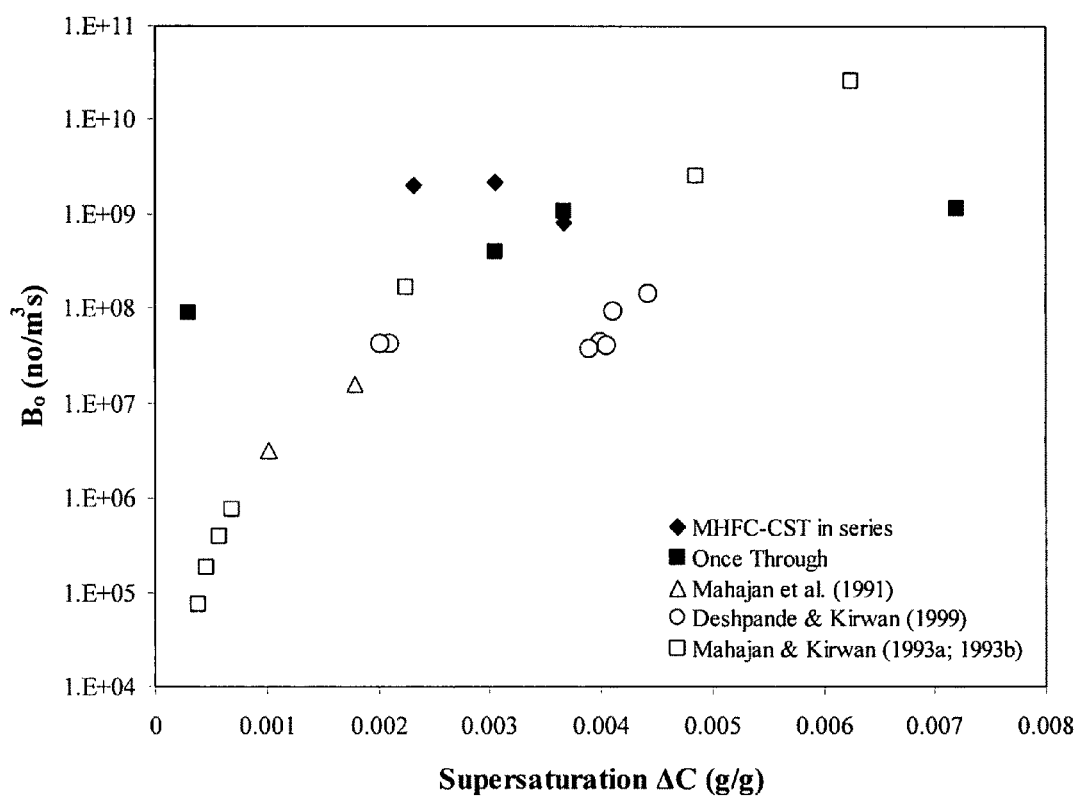
FIG. 15 is a plot of nucleation rates obtained during antisolvent crystallization of L-asparagine in porous hollow fiber devices according to the present disclosure as compared to controls. [Crystallization in shell side.]

FIG. 15 shows a plot of nucleation rates obtained for exemplary implementations of the present disclosure and comparative literature data for batch stirred crystallizers [Mahajan (1991); Despande (1999)] and tubular precipitators [Mahajan et al., "Rapid precipitation of biochemicals," *Journal of Physics: Applied Physics*, 26(8B), B176-B180 (1993); Mahajan et al., "Nucleation and growth kinetics of biochemicals measured at very high supersaturation," *Journal of Crystal Growth*, 144(3-4), 281-290 (1993)]. In addition, some literature data quoted values between $10^4$ and $10^7$ no/m$^3$ s for supersaturations ranging from 0.001 to 0.002 g/g. [Mahajan (1991)] Combining the data of the embodiments represented in FIG. 15 with this literature information, it follows that the nucleation rates obtained in the PHFAC apparatus for the same supersaturations may be similar or slightly higher compared to batch stirred crystallizers. The difference may be higher at low supersaturations, up to 5 orders of magnitude.

At higher supersaturations, MHFCs yield an order of magnitude higher nucleation rates. The better performance in terms of nucleation rate observed for solid hollow fiber cooling crystallization is also characteristic of the disclosed porous hollow fiber antisolvent crystallization. [Zarkadas et al., "Solid Hollow Fiber Cooling Crystallization," *Industrial & Engineering Chemistry Research*, 43(22), 7163-7180 (2004)] Compared to tubular precipitators, the nucleation rates in the PHFAC experimental setup were up to 4 orders of magnitude higher at low supersaturations and comparable or slightly lower at larger supersaturations. This result is surprising because tubular precipitators usually yield much higher nucleation rates. The high nucleation rates observed in the PHFAC may be due to the inherent characteristics of feed introduction that membrane hollow fiber crystallizers offer. A large number of feed solution fluid elements are created at the mouth of the membrane pores, which are exposed to the high supersaturation levels created by their contact with the antisolvent. Similarly, high supersaturations may also be created in a stirred vessel. However, mesomixing limitations in combination with a small induction time may result in larger particles and correspondingly lower nucleation rates.

Porous hollow fiber devices according to the present disclosure offer many advantageous properties for purposes of antisolvent crystallization. For example, porous hollow fiber devices/systems offer high degrees of flexibility in design and operation. Porous hollow fiber devices/systems for use in antisolvent crystallization are easy to design and control, and their scale-up is straightforward. Used in part for their mixing properties, porous hollow fiber devices/systems offer various advantages compared to traditional mixing equipment. For example, for a given geometrical design of the porous hollow fiber device, one can accurately control the final concentration of the added component in the exit stream by manipulating only two operating parameters, namely the shell side pressure and tube side flow rate. In addition, by packing more/less fibers for a given shell dimension, one can increase/decrease, respectively, the final concentration of the added component for the same feed volumetric throughput.

For the exemplary embodiments described herein, final concentrations of up to 30% by weight were achieved. Higher values are possible with alternative designs/implementations by raising the shell side pressure and/or lowering the tube side velocity. The final concentrations achieved according to the present disclosure are considerably higher compared to what has been practiced until now in membrane reactors, especially for liquid phase reactions. They also point to the possibility of carrying out antisolvent crystallization in a 1:1 stoichiometric ratio.

The operating conditions for achieving desired results are favorable. Higher concentrations of the added component are obtained at low tube side velocities, which in turn allows for larger residence times inside the hollow fiber membrane. Therefore, more time is available for crystallization to occur. Also, mixing in the radial direction will be considerably enhanced. The results presented herein show that the permeate flow can reach the centerline of the fibers very quickly. Improved results may be achieved by using smaller fiber diameters as compared to those utilized in the experimental runs described herein.

As noted above, some exemplary embodiments run with crystallization in the tube side encountered difficulties. Despite the fact that crystal samples, whose crystal size distribution was shifted to smaller sizes compared to literature data obtained in batch stirred crystallizers, were obtained, operation of the MHFCs was characterized by a decrease of the permeation rate of the antisolvent and consequently the supersaturation generated with time. In these embodiments, such an effect may be undesirable and may lead to a situation where crystallization cannot be continued for a prolonged period of time. This decrease in antisolvent flux is in accordance with previous crystallization and precipitation studies in membrane hollow fiber devices. However, it may be attributed primarily to fiber blockage by newly formed crystals and, on a secondary basis, to pore blockage. According to the present disclosure, however, manipulation of the operating conditions and design dimensions of the device/system may be effective to overcome the noted operational limitations for tube side crystallization.

For the exemplary systems described herein, namely L-asparagine in water and IPA (antisolvent), the MHFC-CST in series and the once through mode of operation demonstrated advantageous results. The crystal size distributions obtained for both systems were shifted to smaller sizes compared to literature data obtained in batch stirred vessels obtained under the same supersaturation conditions. About 90% percent of the crystals produced were smaller than 75 μm for the MHFC-CST in series runs, while the respective value for the once through operation mode was around 165 μm. These results compare favorably to 85-180 μm and 300 μm obtained, respectively, in batch stirred vessels and MSMPR crystallizers. They are also sufficient for most crystalline pharmaceutical products, for which bioavailability and/or formulation concerns dictate the desired CSD.

In addition, mean crystal sizes ranging between 36-44 μm and 37-95 μm were obtained for the MHFC-CST in series embodiments and the once through operation mode embodiments, respectively. Compared to batch stirred crystallizers, these results are about two times lower for the former and similar for the latter. Once through runs were characterized by broader distributions as compared to the MHFC-CST in series runs as indicated by the CV of the CSD, due to local supersaturation generation and depletion. Therefore, the combination of a MHFC with a downstream mixing device is more advantageous for some embodiments. Static mixers are other mixing techniques could also offer an alternative technique, rather than or in addition to stirred tanks.

The higher CV values for the MHFC-CST in series runs compared to literature data may be attributed to the combination of a lower mean size and comparable SD values in some embodiments. In other embodiments, the disclosed porous hollow fiber devices present similar or slightly better nucleation performance as compared to stirred vessels. The nucleation rates obtained in the PHFAC experimental setup were 1-4 orders of magnitude higher, the difference reaching its maximum value at low supersaturations. The same trends were also found by a comparison with tubular precipitators at low supersaturations. At higher supersaturations, the performance of membrane hollow fiber crystallizers was shown to be comparable or slightly inferior to their tubular counterparts.

In alternative embodiments, the CSD characteristics of MHFCs can be considerably improved relative to the experimental results described herein. Alternative designs may feature a cylindrical geometry, which would be useful in heat transfer and cooling crystallization applications and result in close packing of the fibers in a cylindrical shell. The diameter of the cylindrical shell would be influenced by the smallest opening of the male run tees used for the fabrication of the MHFCs. Limitations in male tee opening size can promote crystal entrapment in the interfiber space and subsequent gradual blockage. Although this phenomenon was not observed for the larger part of the crystallizer, it was observed at the shell side outlet and necessitated the use of high antisolvent flow rates.

Enhanced system performance may also be achieved by implementing a more open geometry. A shell of rectangular cross section would be very useful. In such an arrangement, the fibers can be placed in a layered structure with a suitable spacing and a staggered fiber arrangement. In yet another embodiment, cross flow of the antisolvent can be easily applied. This would help to sweep newly formed crystals from the fiber surface and improve mixing in the shell side of the device. In another embodiment, the shell side inlet and outlet are designed to promote crystal removal from the MHFC interior. Computational fluid dynamics could be used as a guide for the selection and implementation of the appropriate shape for the shell inlet and outlet ports to facilitate crystal removal.

Although the systems and methods of the present disclosure have been described with reference to exemplary embodiments, the present disclosure is neither limited by or to such exemplary embodiments. Rather, the antisolvent crystallization systems and methods of the present disclosure are susceptible to many changes, variations, modifications and/or enhancements without departing from either the spirit or scope of the present disclosure. For example, the disclosed systems and methods may be implemented with an intermittent crystallizing solution feed to the tube side, e.g., using appropriate valving/pumps, to reduce the potential for crystallization blockages to form. In one such exemplary implementation, a crystallizing solution and a non-crystallizing solution would alternately be fed to the tube side of the disclosed porous hollow fiber device/system. Accordingly, the present disclosure expressly encompasses changes, variations, modifications and/or enhancements that will be apparent to person skilled in the art based on the present disclosure.

NOMENCLATURE

B nucleation rate, no $m^{-3} s^{-1}$

C actual concentration, kg/kg, kmol $m^{-3}$

ΔC concentration difference or supersaturation, g/g,

CV coefficient of variation $d_{10}$ crystal size corresponding to the $10^{th}$ percentile of the cumulative undersize curve $d_{50}$ crystal size corresponding to the $50^{th}$ percentile of the cumulative undersize curve $d_{90}$ crystal size corresponding to the $90^{th}$ percentile of the cumulative undersize curve D tube/shell diameter, m $d_p$ pore diameter, m $D_s$ inside shell diameter, m ΔH pressure head difference, psi H pressure head, psi J volumetric flux, $m^3 m^{-2} s^{-1}$ $k_v$ crystal volume shape factor, dimensionless ΔL crystal class size interval, μm L length or crystal size, m $L_1$ lower crystal size measured, μm $L_2$ upper crystal size measured, μm m mass, kg $\dot{m}$ mass flow rate, kg $s^{-1}$ $M_T$ magma density, kg/$m^3$ n population density, no $m^{-3} m^{-1}$ N number of fibers ΔP pressure drop, Pa P pressure, Pa SD standard deviation $t_{cen}$ time required for the permeate to be transported convectively to centerline of a hollow fiber, s $t_{samp}$ sampling time, s u velocity, m/s V volume, $m^3$ $\dot{V}$ volumetric flow rate, $m^3 s^{-1}$ W weight, kg $x_w$ weight fraction Greek Symbols ε porosity (dimensionless) or mean specific power input, W kg$^{-1}$ $\epsilon_m$ membrane porosity, dimensionless $\lambda_K$ Kolmogorov scale, μm μ viscosity, kg m$^{-1}$s$^{-1}$ ρ density, kg m$^{-3}$ τ mean residence/retention time, s $\tau_m$ membrane tortuosity, dimensionless Subscripts/Superscripts AS antisolvent c crystal cr cross flow CST completely stirred tank f feed fil filtrate inside or crystal class in inlet m membrane or mean o outside out outlet p pore s shell t tube side tot total

The invention claimed is:

1. A crystallization method, comprising:
   a. providing a porous hollow fiber module that includes a plurality of porous hollow fibers positioned within a shell, each porous hollow fiber defining a lumen side and shell side;
   b. introducing crystallizing solution to either the lumen side or shell side of the porous hollow fibers;
   c. introducing an antisolvent to either the lumen side or shell side of the porous hollow fibers, the antisolvent being introduced to the side not containing the crystallizing solution;
   d. permitting a portion of at least one of the crystallizing solution and the antisolvent to permeate through the porous hollow fibers to an opposite side thereof, thereby establishing radial mixing on the opposite side of the porous hollow fibers;
   e. permitting crystallization from the crystallizing solution in contact with the antisolvent to form crystals.

2. A crystallization method according to claim 1, wherein the shell defines a geometry selected from a cylindrical cross-section and a rectangular cross-section.

3. A crystallization method according to claim 1, wherein the crystallizing solution is introduced to the lumen side of the porous hollow fibers.

4. A crystallization method according to claim 3, wherein a portion of the crystallizing solution permeates through the porous hollow fiber to contact the antisolvent on the shell side of the porous hollow fibers.

5. A crystallization method according to claim 4, wherein crystals are formed from the crystallizing solution on the shell side of the porous hollow fibers.

6. A crystallization method according to claim 3, wherein a portion of the antisolvent permeates through the porous hollow fibers and contacts the crystallizing solution on the lumen side of the porous hollow fibers.

7. A crystallization method according to claim 6, wherein crystals are formed from the crystallizing solution on the lumen side of the porous hollow fibers.

8. A crystallization method according to claim 1, wherein the antisolvent and the crystallization solution are miscible.

9. A crystallization method according to claim 1, wherein the antisolvent and the crystallizing solution are in cocurrent flow.

10. A crystallization method according to claim 1, wherein the antisolvent and the crystallizing solution are in countercurrent flow.

11. A crystallization method according to claim 1, wherein the crystals exhibit a crystal size distribution confined to sizes of less than 100 μm.

12. A crystallization method according to claim 1, further comprising downstream mixing relative to the flow of crystallizing solution in contact with the antisolvent.

13. A crystallization method according to claim 12, wherein the downstream mixing is effected by a completely stirred tank or a static mixer.

14. A crystallization method according to claim 1, wherein one or more of the plurality of porous hollow fibers includes at least one region of impermeability.

15. A crystallization method according to claim 14, wherein the at least one region of impermeability constitutes between about one third and about two thirds of the axial length of said one or more of the plurality of porous hollow fibers.

16. A crystallization system according to claim 1, wherein the antisolvent is non-aqueous.

17. A crystallization system according to claim 1, wherein the crystallization occurs in the absence of a reaction between the crystallizing solution and the antisolvent.

18. A crystallization system according to claim 1, wherein the crystallizing solution and a non-crystallizing solution are introduced intermittently to the porous hollow fiber membrane.

19. A crystallization system, comprising:
   a. a porous hollow fiber membrane that includes a plurality of porous hollow fibers, each porous hollow fiber defining a lumen side and shell side;
   b. a supply of crystallizing solution in flow communication with either the lumen side or shell side of the porous hollow fibers; and
   c. a supply of antisolvent in flow communication with either the lumen side or shell side of the porous hollow fibers, the antisolvent being in flow communication with the side not in flow communication with the crystallizing solution;
   wherein operating conditions associated with the porous hollow fiber membrane are controlled such that at least one of the crystallizing solution and the antisolvent permeates through the porous hollow fibers and form crystals in contact with the other of the crystallizing solution and the antisolvent.

20. A crystallization system according to claim 19, further comprising a downstream mixer in flow communication with at least one of the lumen side and the shell side of the porous hollow fibers.

21. A crystallization system according to claim 20, wherein the downstream mixer is a completely stirred mixer or a static mixer.

22. A crystallization system according to claim 19, wherein the controlled operating conditions include at least one of pressure differential between the lumen side and the shell side of the porous hollow fibers, flow velocity of the antisolvent, flow velocity of the crystallizing solution, concentration of the crystallizing solution, composition of the antisolvent, and composition of the crystallizing solution.

23. A crystallization system according to claim 19, wherein the porous hollow fibers are fabricated from a polymeric or ceramic material.

24. A crystallization system according to claim 19, wherein the porous hollow fiber membranes includes one or more porous hollow fibers that define at least one impermeable region.

25. A crystallization system according to claim 24, wherein the impermeable region constitutes between about one third and about two thirds of the axial length of the one or more porous hollow fibers.

* * * * *